United States Patent
Yang et al.

(10) Patent No.: US 10,331,967 B1
(45) Date of Patent: Jun. 25, 2019

(54) MACHINE LEARNING VIA A TWO-DIMENSIONAL SYMBOL

(71) Applicant: GYRFALCON TECHNOLOGY INC., Milpitas, CA (US)

(72) Inventors: Lin Yang, Milpitas, CA (US); Baohua Sun, Fremont, CA (US)

(73) Assignee: Gyrfalcon Technology Inc., Milpitas, CA (US)

( * ) Notice: Subject to any disclaimer, the term of this patent is extended or adjusted under 35 U.S.C. 154(b) by 0 days.

(21) Appl. No.: 16/210,759

(22) Filed: Dec. 5, 2018

(51) Int. Cl.
- G06K 9/46 (2006.01)
- G06K 9/62 (2006.01)
- G06F 17/27 (2006.01)

(52) U.S. Cl.
CPC ....... G06K 9/4642 (2013.01); G06F 17/2785 (2013.01); G06K 9/623 (2013.01); G06K 9/6262 (2013.01); G06K 9/6268 (2013.01)

(58) Field of Classification Search
None
See application file for complete search history.

(56) References Cited

U.S. PATENT DOCUMENTS

| | | | | |
|---|---|---|---|---|
| 9,396,377 | B2* | 7/2016 | van der Merwe | G06K 7/1447 |
| 10,083,171 | B1* | 9/2018 | Yang | G06N 3/063 |
| 10,169,684 | B1* | 1/2019 | Nathan | G06K 9/6276 |
| 10,198,648 | B1* | 2/2019 | Bradley | G06K 9/18 |
| 2003/0110035 | A1* | 6/2003 | Thong | G10L 15/083 704/254 |
| 2009/0048841 | A1* | 2/2009 | Pollet | G10L 13/07 704/260 |
| 2010/0286979 | A1* | 11/2010 | Zangvil | G06F 17/273 704/9 |
| 2011/0127321 | A1* | 6/2011 | Butler | G06K 5/02 235/375 |
| 2013/0002553 | A1* | 1/2013 | Colley | G06F 3/0236 345/161 |
| 2013/0060786 | A1* | 3/2013 | Serrano | G06K 9/3258 707/749 |

(Continued)

OTHER PUBLICATIONS

Garnelo, Marta, and Murray Shanahan. "Reconciling deep learning with symbolic artificial intelligence: representing objects and relations." Current Opinion in Behavioral Sciences 29 (2019): 17-23. (Year: 2019).*

(Continued)

*Primary Examiner* — Andrae S Allison
(74) *Attorney, Agent, or Firm* — RC Patent Services

(57) ABSTRACT

Methods of facilitating machine learning via a 2-D symbol are disclosed. Features of an object are received in a first computing system having a 2-D symbol creation application module installed thereon. A multi-layer 2-D symbol is formed from the features according to a set of symbol creation rules. 2-D symbol is a matrix of N×N pixels partitioned into a number of sub-matrices with each sub-matrix containing one feature, where N is a positive integer. Meaning of the combined features in the 2-D symbol is learned in a second computing system by using an image processing technique to classify the 2-D symbol transmitted from the first computing system. The symbol creation rules determine the importance order, size and location of sub-matrices in the 2-D symbol.

15 Claims, 25 Drawing Sheets

(56) References Cited

U.S. PATENT DOCUMENTS

2017/0200193 A1* 7/2017 Bigley ............... G06K 7/10722
2018/0150956 A1* 5/2018 Kao ..................... G06T 7/11

OTHER PUBLICATIONS

Besold, Tarek R., et al. "Neural-symbolic learning and reasoning: A survey and interpretation." arXiv preprint arXiv:1711.03902 (2017). (Year: 2017).*
Gaur1 et al, 2D QR Barcode Recognition Using Texture Features and Neural Network, International Journal of Research in Advent Technology, vol. 2, No. 5, May 2014. (Year: 2014).*
Garnelo, Marta, Kai Arulkumaran, and Murray Shanahan. "Towards deep symbolic reinforcement learning." arXiv preprint arXiv: 1609.05518 (2016). (Year: 2016).*
Nesson, Carly. "Encoding multi-layered data into QR codes for increased capacity and security." South Dakota School of Mines and Technology(2013). (Year: 2013).*
Fredrik Fridborn, Reading barcodes with neural networks, Master of Science Thesis in Electrical Engineering Department of Electrical Engineering, Linköping University, 2017 (Year: 2017).*
Shur et al. "A Corpus of Natural Language for Visual Reasoning", 2017, Facebook AI Research, Menlo Park, CA.
Yoon Kim, "Convolutional Neural Networks for Sentence Classification", Sep. 2014, New York University.
Rastegari et al. "XNOR-Net: ImageNet Classification Using Binary Convolutional Neural Networks", Aug. 2, 2016, Allen Institute for AI, Univ. of Washington.
Gysel et al. "Hardware-Oriented Approximation of Convolutional Neural Networks", Oct. 20, 2016, Department of Electrical and Computer Engineering, University of California, Davis, CA.

* cited by examiner

US 10,331,967 B1

MACHINE LEARNING VIA A TWO-DIMENSIONAL SYMBOL

FIELD

This patent document relates generally to the field of machine learning. More particularly, the present document relates to machine learning via a two-dimensional (2-D) symbol.

BACKGROUND

Machine learning is an application of artificial intelligence. In machine learning, a computer or computing device is programmed to think like human beings so that the computer may be taught to learn on its own. The development of neural networks has been key to teaching computers to think and understand the world in the way human beings do.

Started in the 1950s, many milestones of discovery and achievement in machine learning have been reached. Notable discoveries and achievements include, but are limited to, Logistic Regression, Support Vector Machine (SVM), Gradient Boosting Machine (GBM), etc. Then deep learning became more feasible in 2010s. One particular implementation is referred to as Cellular Neural Networks or Cellular Nonlinear Networks (CNN) based computing system. CNN based computing system has been used in many different fields and problems including, but not limited to, image processing.

SUMMARY

This section is for the purpose of summarizing some aspects of the invention and to briefly introduce some preferred embodiments. Simplifications or omissions in this section as well as in the abstract and the title herein may be made to avoid obscuring the purpose of the section. Such simplifications or omissions are not intended to limit the scope of the invention.

Methods of facilitating machine learning via a 2-D symbol are disclosed. According one aspect of the disclosure, a number of features of an object are received in a first computing system having a 2-D symbol creation application module installed thereon. A multi-layer 2-D symbol is formed from the features according to a set of symbol creation rules. 2-D symbol is a matrix of N×N pixels partitioned into a number of sub-matrices with each sub-matrix containing one feature, where N is a positive integer. Meaning of the combined features in the 2-D symbol is learned in a second computing system by using an image processing technique to classify the 2-D symbol transmitted from the first computing system.

According to another aspect of the disclosure, the set of symbol creation rules contain the following actions: determining an importance order of the plurality of features based on one of machine learning techniques; associating a corresponding feature with said each sub-matrix according to the importance order; determining a size of said each sub-matrix based on the corresponding feature; and placing said each sub-matrix in a particular location in the 2-D symbol according to the size and the importance order.

According to yet another aspect of the disclosure, a string of natural language texts and a number of features associated with the texts are received in a first computing system having a 2-D symbol creation application module installed thereon. A multi-layer 2-D symbol is formed from the texts along with the features according to a set of symbol creation rules. 2-D symbol is a matrix of N×N pixels divided into first and second portions. The first portion is configured for containing the texts while the second portion is partitioned into a number of sub-matrices with each sub-matrix containing one of the features, where N is a positive integer. Meaning of the string of natural language texts along with the associated features contained in the 2-D symbol is learned in a second computing system by using an image processing technique to classify the 2-D symbol transmitted from the first computing system. The symbol creation rules determine the importance order, size and location of sub-matrices in the 2-D symbol.

Objects, features, and advantages of the invention will become apparent upon examining the following detailed description of an embodiment thereof, taken in conjunction with the attached drawings.

BRIEF DESCRIPTION OF THE DRAWINGS

These and other features, aspects, and advantages of the invention will be better understood with regard to the following description, appended claims, and accompanying drawings as follows:

DETAILED DESCRIPTIONS

In the following description, numerous specific details are set forth in order to provide a thorough understanding of the invention. However, it will become obvious to those skilled in the art that the invention may be practiced without these specific details. The descriptions and representations herein are the common means used by those experienced or skilled in the art to most effectively convey the substance of their work to others skilled in the art. In other instances, well-known methods, procedures, and components have not been described in detail to avoid unnecessarily obscuring aspects of the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Used herein, the terms "vertical", "horizontal", "diagonal", "left", "right", "top", "bottom", "column", "row", "diagonally" are intended to provide relative positions for the purposes of description, and are not intended to designate an absolute frame of reference. Additionally, used herein, term "character" and "script" are used interchangeably.

Embodiments of the invention are discussed herein with reference to FIGS. 1-15. However, those skilled in the art will readily appreciate that the detailed description given herein with respect to these figures is for explanatory purposes as the invention extends beyond these limited embodiments.

Figure 1:
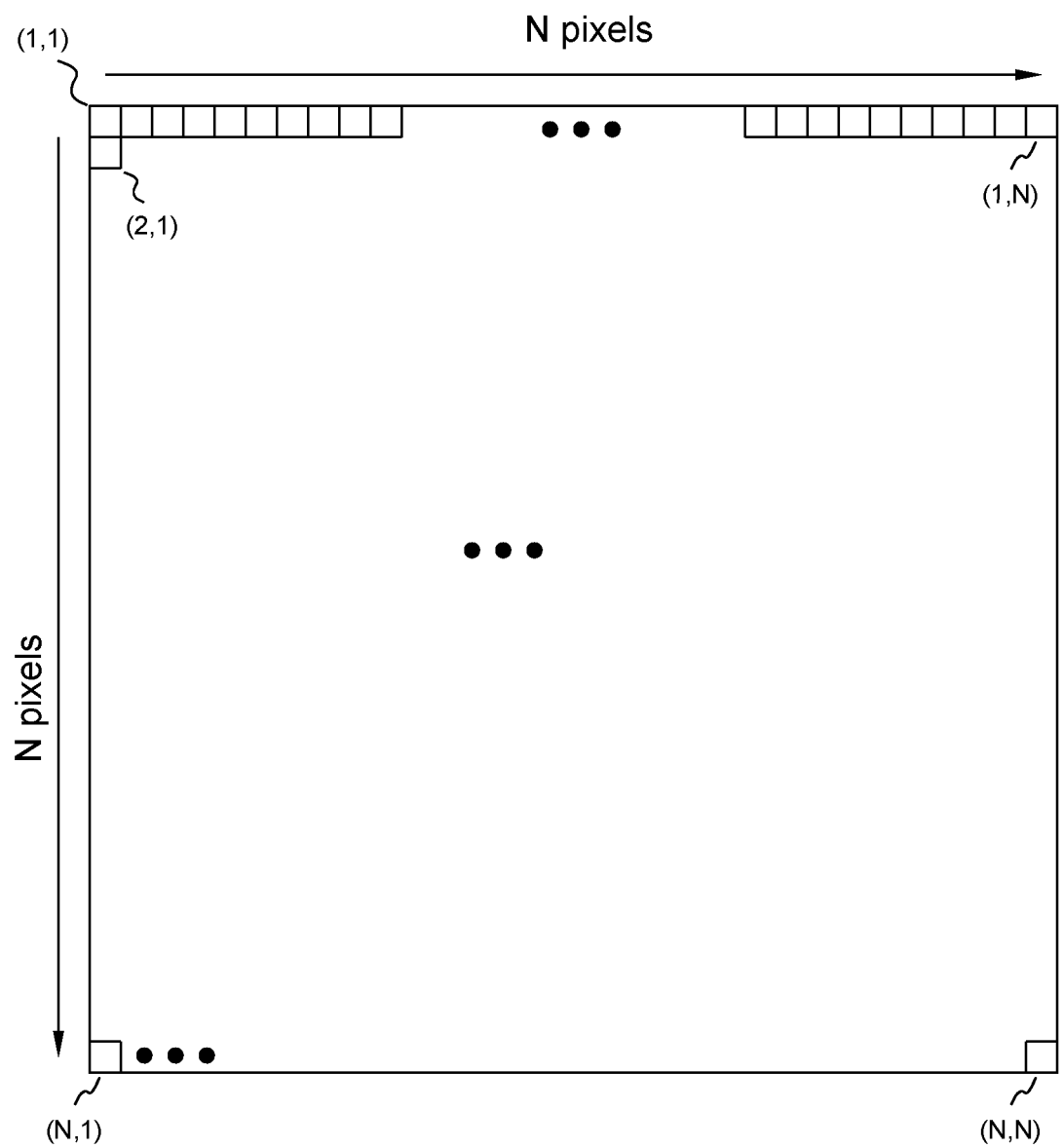
FIG. 1 is a diagram illustrating an example two-dimensional (2-D) symbol comprising a matrix of N×N pixels of data for facilitating machine learning of a meaning of combined features contained therein according to an embodiment of the invention.

Referring first to FIG. 1, it is shown a diagram showing an example two-dimensional (2-D) symbol 100 for facilitating machine learning of a meaning of combined features contained therein. The two-dimensional symbol 100 comprises a matrix of N×N pixels (i.e., N columns by N rows) of data. Pixels are ordered with row first and column second as follows: (1,1), (1,2), (1,3), . . . (1,N), (2,1), . . . , (N,1), (N,N). N is a positive integer or whole number, for example in one embodiment, N is equal to 224.

Figure 2A:
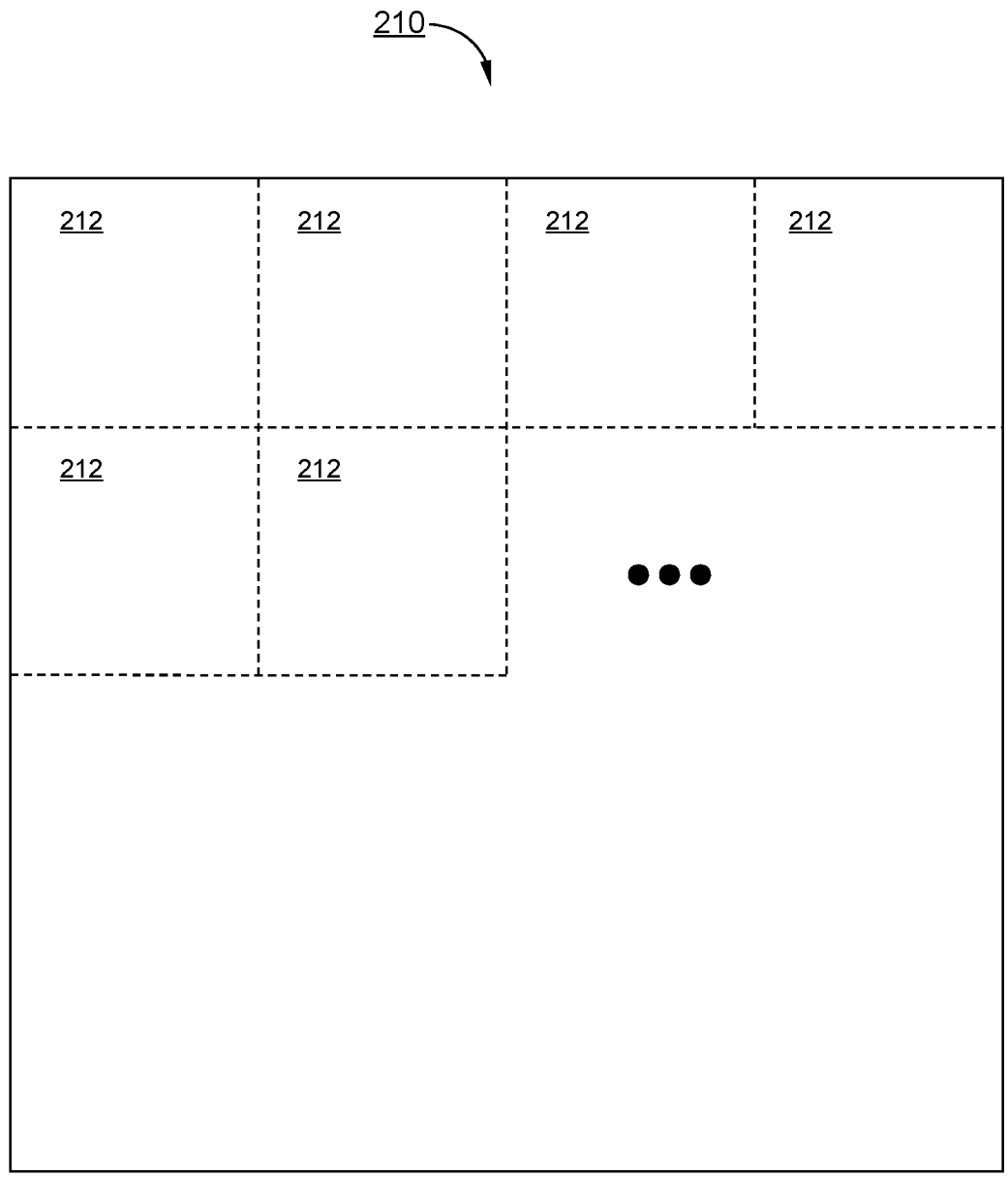
FIGS. 2A-2B are diagrams showing two example schemes to include features of an object in the example 2-D symbol of FIG. 1 according to an embodiment of the invention.
Figure 2B:
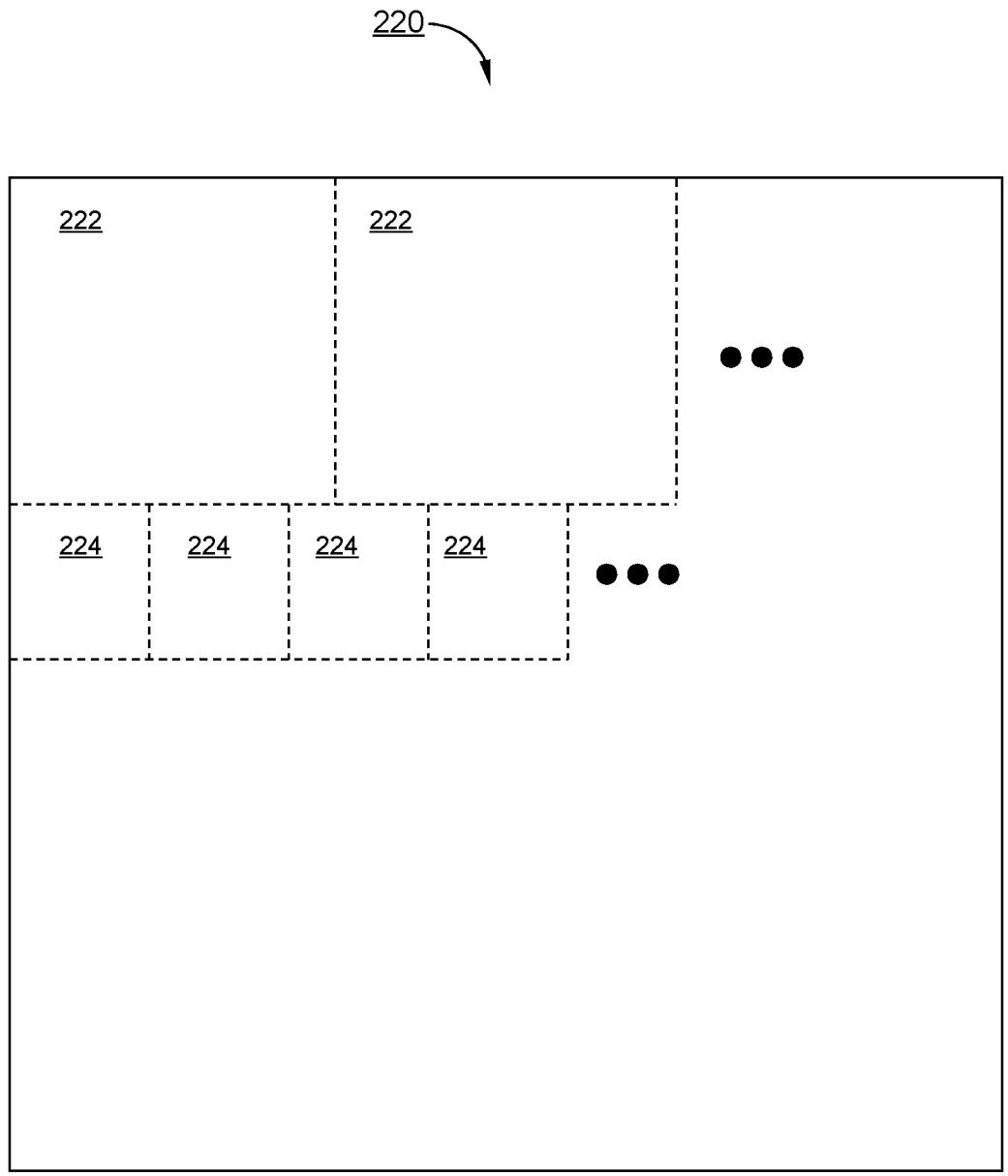

FIG. 2A is a first scheme 210 to store features 212 of an object in the example 2-D symbol 100 of FIG. 1. In the first example scheme 210, features 212 are evenly located with equal size. In the second example scheme 220, a first group of features 222 have a larger size while a second group of features 224 have a smaller size. The total number of features is a positive number or integer.

In the first example scheme 210, all features 212 have equal importance. In the second example scheme 220, the first group of features 222 are more important than the second group of features 224. There is no set limit as to how many groups of features or how many features in a particular group. In other words, there are other schemes that are not shown.

There are two types of features: numerical and categorical. One requirement of the feature is unique representation for each sample object.

Numerical features may have different forms, for example, whole number, number with fraction, etc. To ensure unique representation, several techniques may be used to represent numerical category in a 2-D symbol. In one embodiment, numerical feature is represented by corresponding number glyph (e.g., age in FIG. 2C). In another embodiment, numerical feature is quantized into color intensity (e.g., in a range between 0 and 255) that can be represented by data in each pixel of the 2-D symbol. In yet another embodiment, numerical feature is quantized into a specific numerical value levels to ensure unique representation of the feature.

To ensure unique representation for categorical features, there are also several techniques. In one embodiment, initial letter of the word is used (e.g., m for male in FIG. 2C). In another embodiment, entire word is used (e.g., USA arranged in square format). In another embodiment, abbreviation is used In addition, when the feature contains unknown (e.g., "refuse to answer", "not applicable or NA or N/A"), a special symbol is used for such situation.

Figure 2C:
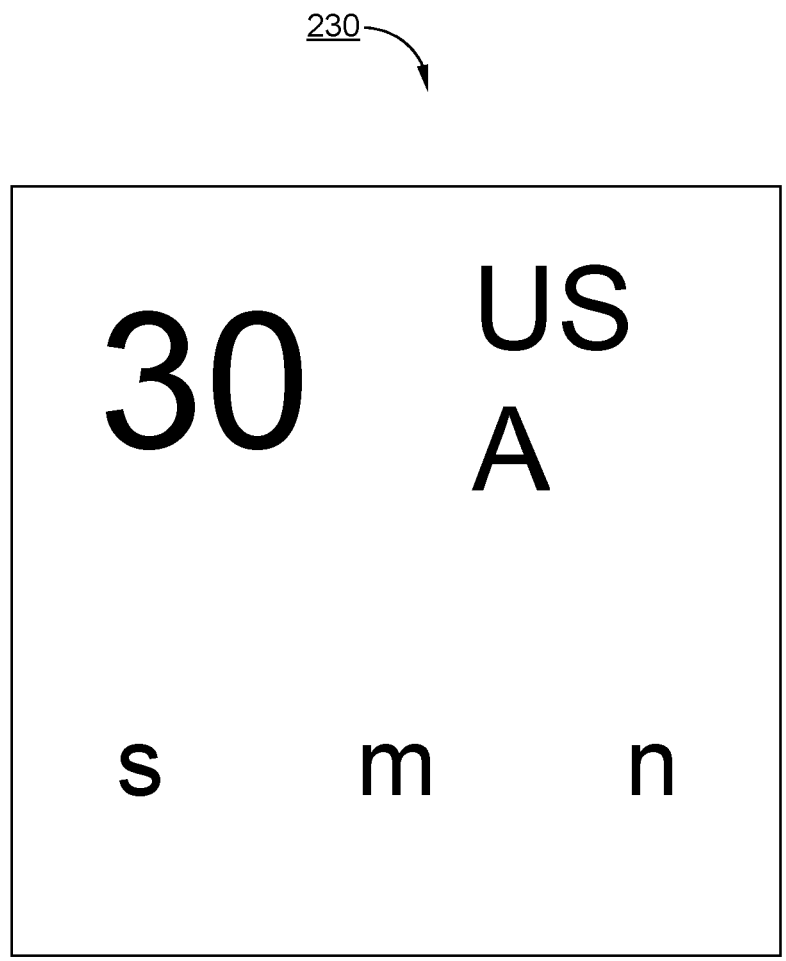
FIG. 2C is a diagram showing an example 2-D symbol contains features of an object in accordance with one embodiment of the invention.

A practical example 2-D symbol 230 is shown in FIG. 2C. There are five features: age—30, nationality—USA, marriage status—single (s), sex—male (m), and parenthood—no (n). Age is a numerical feature while others are categorical features.

Figure 3A:
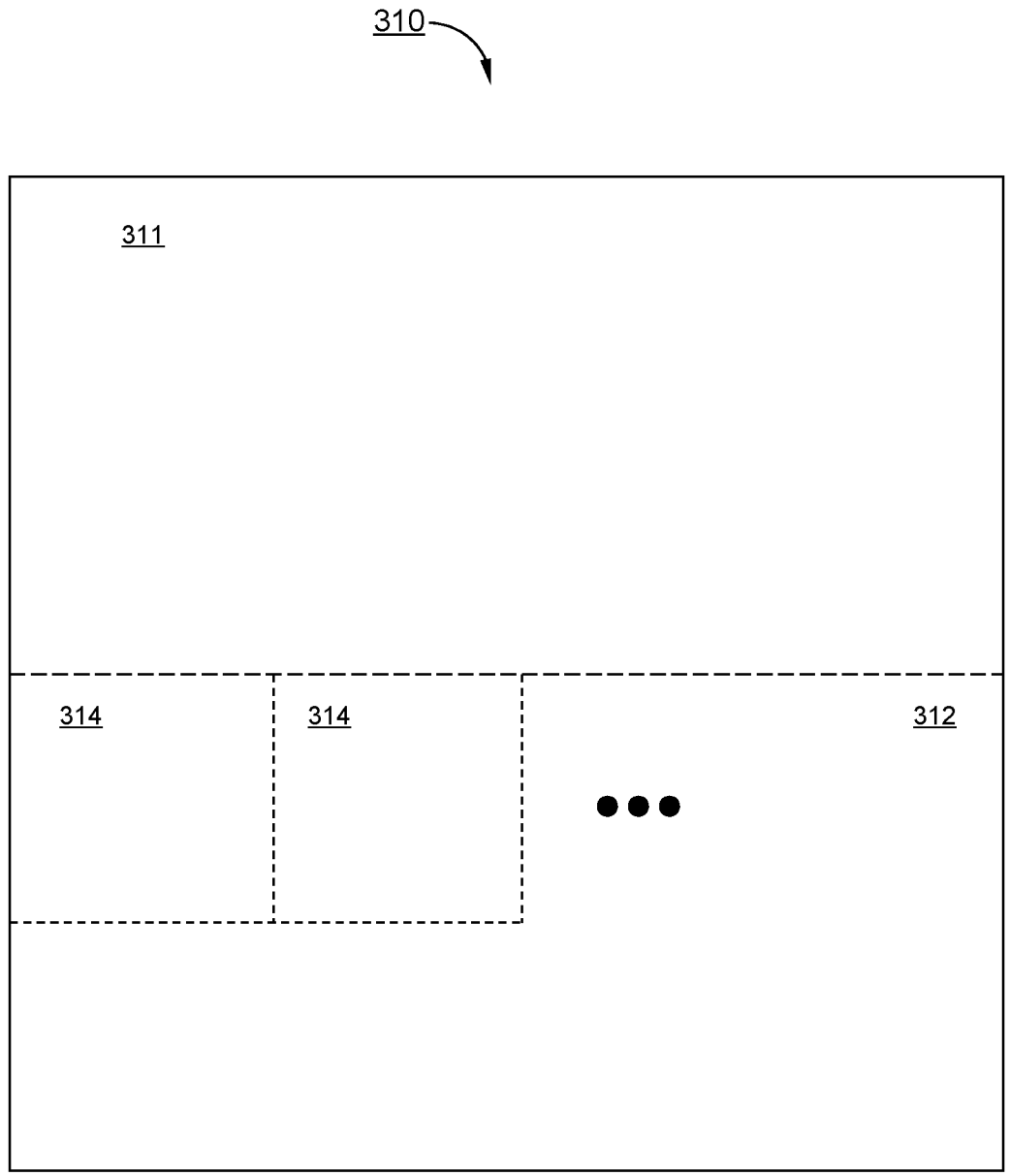
FIG. 3A-3B are diagrams showing two example schemes to store a string of natural language texts along with associated features in the 2-D symbol of FIG. 1 according to an embodiment of the invention.
Figure 3B:
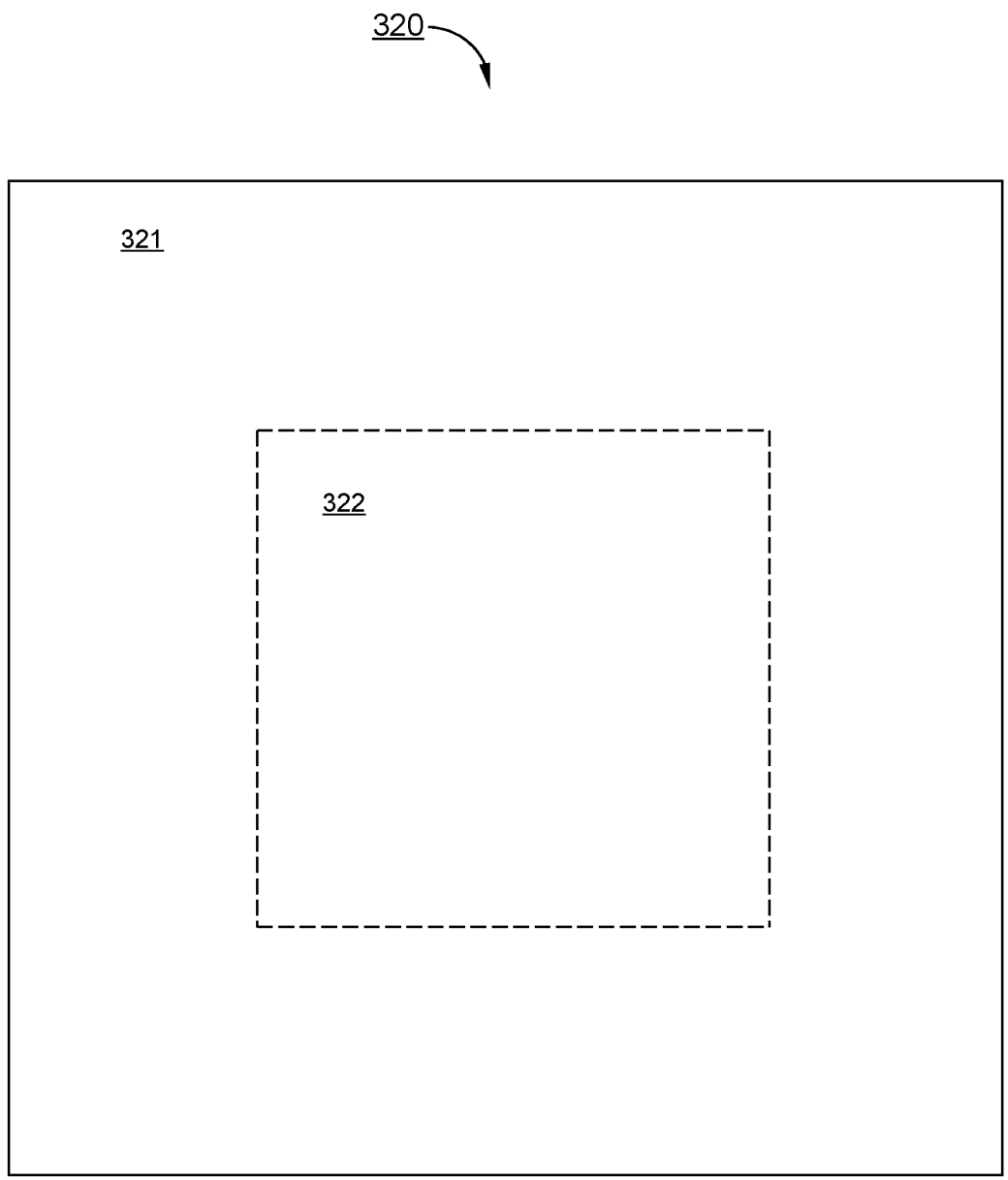

When the object contains a string of natural language texts, the 2-D symbol 100 is configured in different schemes to store both the texts and associated features. In one embodiment, the 2-D symbol 100 is divided into two portions: one for the texts and the other for the associated features. There are many schemes for dividing the 2-D symbol 100. Two example schemes are shown in FIGS. 3A-3B. Natural languages may include, but are not limited to, English, French, German, Spanish, Italian, Chinese, Japanese, Korean, etc. A string of natural language texts can be a phrase, sentence, a passage, a paragraph, an article, and the likes.

In the first example scheme 310 shown in FIG. 3A, the 2-D symbol 100 is divided into first portion 311 and second portion 312. The first portion 311 is configured to contain the string of natural language texts. The second portion 312 is configured to contain associated features 313 of the texts. There are many schemes to store associated features 313. In one embodiment, associated features 313 are located evenly in the second portion with equal size substantially similar to the scheme shown and described in FIG. 2A. In another embodiment, associated features 313 are divided into a plurality of groups with different importance substantially similar to the scheme shown and described in FIG. 2B.

The string of natural language texts are contained in the first portion 312 with various techniques, for example, left-to-right, top-to-bottom, etc.

In the second example scheme 320 shown in FIG. 3B, the second portion 322 is in the center of the 2-D symbol 100 with the first portion 321 surrounding the outside perimeter of the 2-D symbol 100. Again the associated features to be stored in the second portion 322 can be configured with different schemes similar to those schemes shown and described in FIGS. 2A-2B.

In another embodiment, attention mechanism is achieved with the second portion 322 being configured to contain more visible representation of keywords, headlines, first few words of the texts, etc. More visible representation may include larger font or bold font.

Figure 4A:
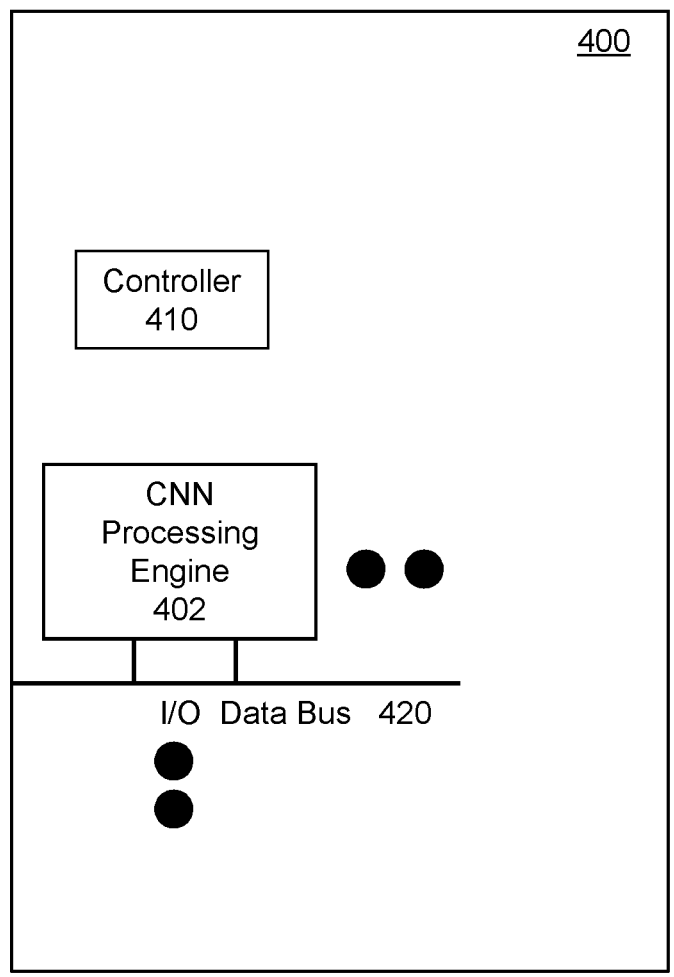
FIG. 4A is a block diagram illustrating an example Cellular Neural Networks or Cellular Nonlinear Networks (CNN) based computing system for machine learning of a meaning of combined features contained in a two-dimensional symbol, according to one embodiment of the invention.

Referring now to FIG. 4A, it is shown a block diagram illustrating an example CNN based computing system 400 configured for machine learning of the meaning of combined features contained in a two-dimensional symbol.

The CNN based computing system 400 may be implemented on integrated circuits as a digital semi-conductor chip (e.g., a silicon substrate in a single semi-conductor wafer) and contains a controller 410, and a plurality of CNN processing units 402a-402b operatively coupled to at least one input/output (I/O) data bus 420. Controller 410 is configured to control various operations of the CNN processing units 402a-402b, which are connected in a loop with a clock-skew circuit (e.g., clock-skew circuit 1540 in FIG. 15).

In one embodiment, each of the CNN processing units 402a-402b is configured for processing imagery data, for example, two-dimensional symbol 100 of FIG. 1.

Figure 4B:
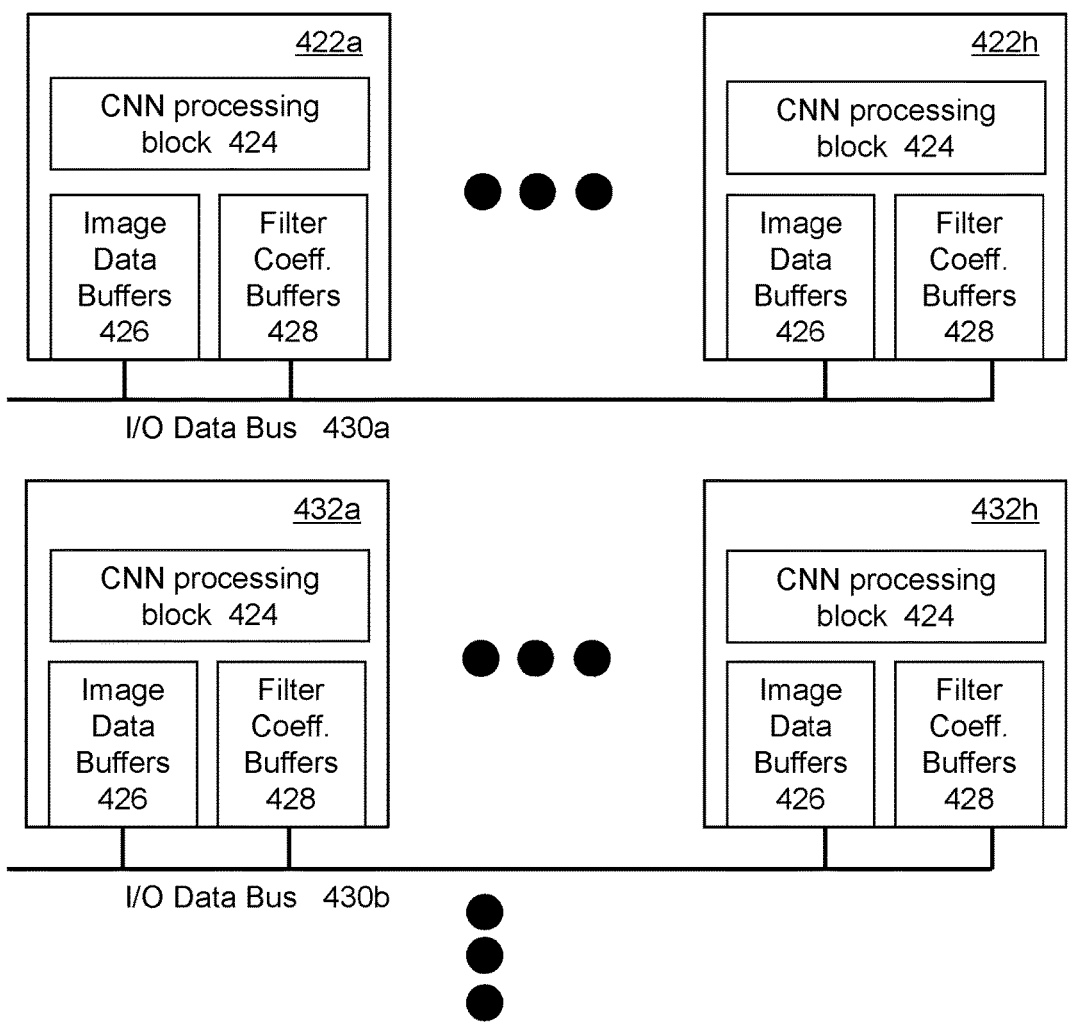
FIG. 4B is a block diagram illustrating an example CNN based integrated circuit for performing image processing based on convolutional neural networks, according to one embodiment of the invention.

In another embodiment, the CNN based computing system is a digital integrated circuit that can be extendable and scalable. For example, multiple copies of the digital integrated circuit may be implemented on a single semi-conductor chip as shown in FIG. 4B. In one embodiment, the single semi-conductor chip is manufactured in a single semi-conductor wafer.

All of the CNN processing engines are identical. For illustration simplicity, only few (i.e., CNN processing engines 422a-422h, 432a-432h) are shown in FIG. 4B. The invention sets no limit to the number of CNN processing engines on a digital semi-conductor chip.

Each CNN processing engine 422a-422h, 432a-432h contains a CNN processing block 424, a first set of memory buffers 426 and a second set of memory buffers 428. The first set of memory buffers 426 is configured for receiving imagery data and for supplying the already received imagery data to the CNN processing block 424. The second set of memory buffers 428 is configured for storing filter coefficients and for supplying the already received filter coefficients to the CNN processing block 424. In general, the number of CNN processing engines on a chip is $2^n$, where n is an integer (i.e., 0, 1, 2, 3, . . . ). As shown in FIG. 4B, CNN processing engines 422a-422h are operatively coupled to a first input/output data bus 430a while CNN processing engines 432a-432h are operatively coupled to a second input/output data bus 430b. Each input/output data bus 430a-430b is configured for independently transmitting data (i.e., imagery data and filter coefficients). In one embodiment, the first and the second sets of memory buffers comprise random access memory (RAM), which can be a combination of one or more types, for example, Magnetic Random Access Memory, Static Random Access Memory, etc. Each of the first and the second sets are logically defined. In other words, respective sizes of the first and the second sets can be reconfigured to accommodate respective amounts of imagery data and filter coefficients.

The first and the second I/O data bus 430a-430b are shown here to connect the CNN processing engines 422a-422h, 432a-432h in a sequential scheme. In another embodiment, the at least one I/O data bus may have different connection scheme to the CNN processing engines to accomplish the same purpose of parallel data input and output for improving performance.

Figure 5A:
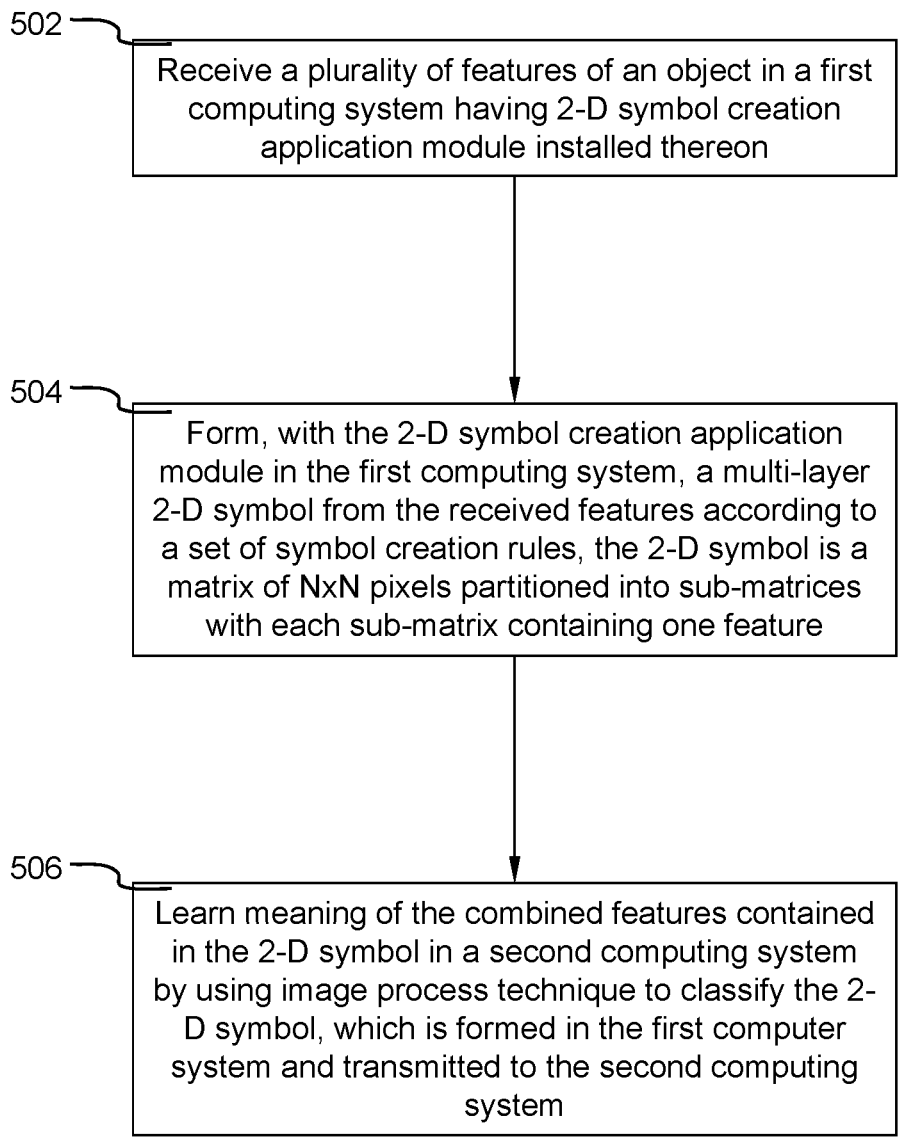
FIGS. 5A-5B is flowcharts illustrating example processes of facilitating machine learning via a 2-D symbol in accordance with one embodiment of the invention.

FIG. 5A is a flowchart illustrating a first example process 500 of facilitating machine learning via a 2-D symbol. Process 500 starts at action 502 by receiving a plurality of features of an object in a first computing system having a 2-D symbol creation application module installed thereon.

Next, at action 504, a multi-layer 2-D symbol is formed from the received features using the 2-D symbol creation application module based on a set of symbol creation rules. The 2-D symbol is a matrix of N×N pixels of data, which is partitioned into sub-matrices with each sub-matrix containing one corresponding feature.

Then, at action 506, meaning of the combined features is learned in a second computing system (e.g., a CNN based computing system 400) by using an image processing technique to classify the 2-D symbol.

Figure 5B:
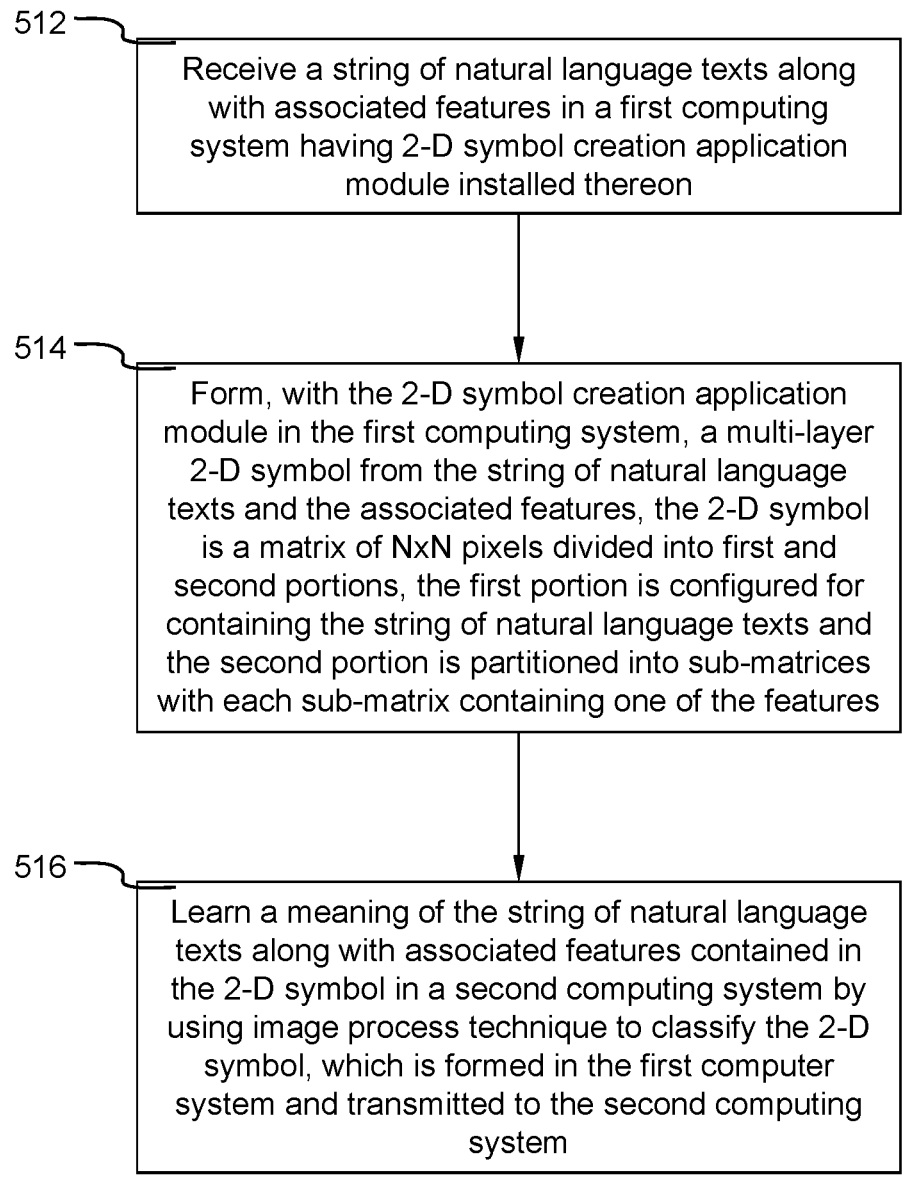

FIG. 5B is a flowchart illustrating a second example process 510 of facilitating machine learning via a 2-D symbol. Process 510 starts at action 512 by receiving a string of natural language texts along with associated features of the texts in a first computing system having a 2-D symbol creation application module installed thereon.

Next, at action 514, a multi-layer 2-D symbol is formed from the string of natural language texts and associated features using the 2-D symbol creation application module. The symbol is a matrix of N×N pixels of data, which is divided into first and second portions. The first portion is configured for containing the string of natural language texts, while the second portion is further divided into a plurality of sub-matrices with each sub-matrix containing one of the associated features.

Then, at action 516, meaning of the natural language texts along with the associated features contained in the 2-D symbol is learning in a second computing system (e.g., a CNN based computing system 400) by using an image processing technique to classify the 2-D symbol.

Figure 5C:
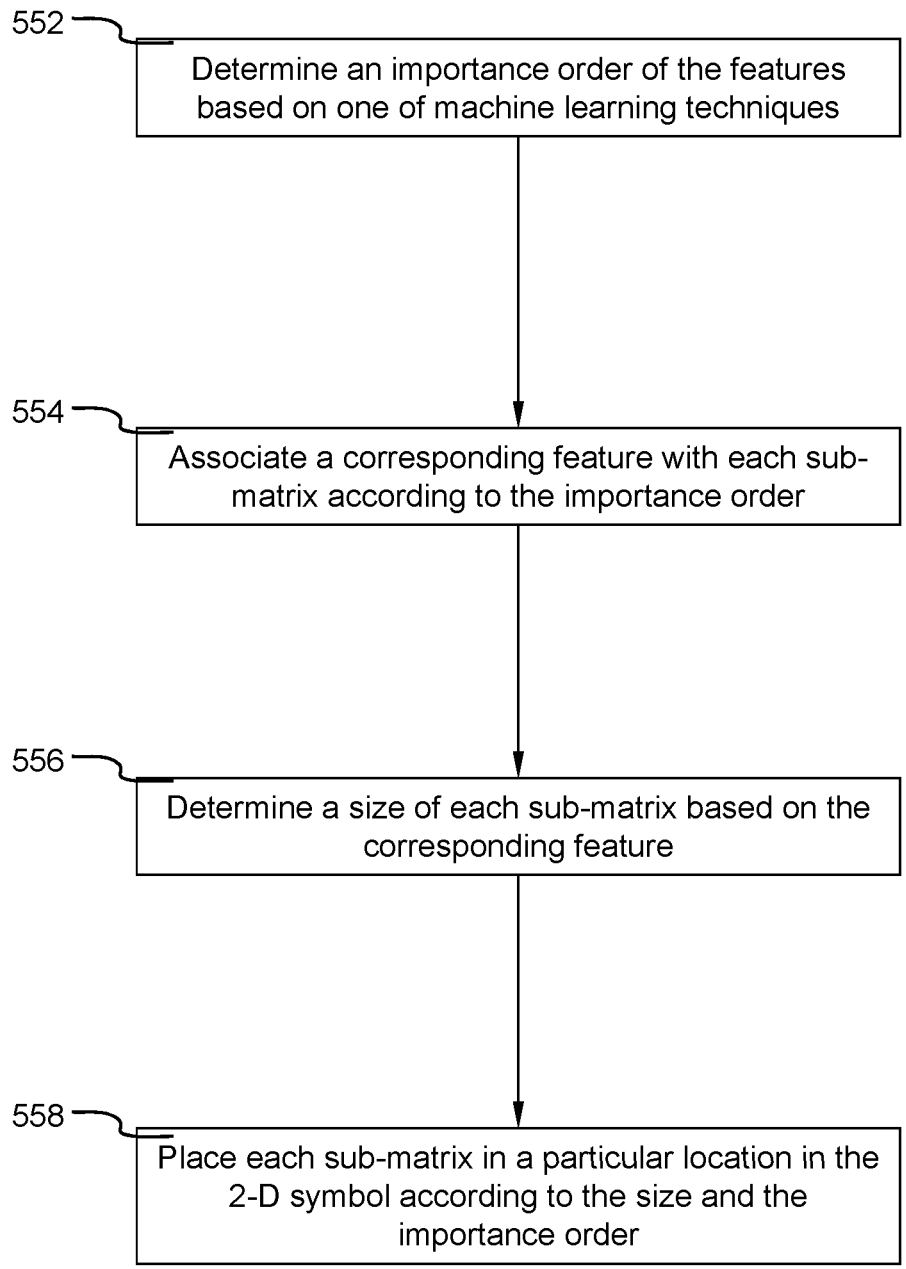
FIG. 5C is a flowchart illustrating an example process of 2-D symbol creation rules, according to one embodiment of the invention.

FIG. 5C is a flowchart illustrating an example process 550 of 2-D symbol creation rules. Process 550 starts at action 552 by determining an importance order of the plurality of features based one of the machine learning techniques. Machine learning techniques include, but are not limited to, Logistic Regression, Support Vector Machine (SVM), Gradient Boosting Machine (GBM), etc.

Next, at action 554, a corresponding feature is associated with a sub-matrix according to the importance order. A size of each sub-matrix is then determined based on the corresponding feature at action 556. In one embodiment, the size of a sub-matrix is based on a square shape. In another embodiment the size of a sub-matrix is based on a rectangular shape.

Then, at action 558, each sub-matrix is placed in a particular location of the 2-D symbol according to the size of the importance order.

Figure 6:
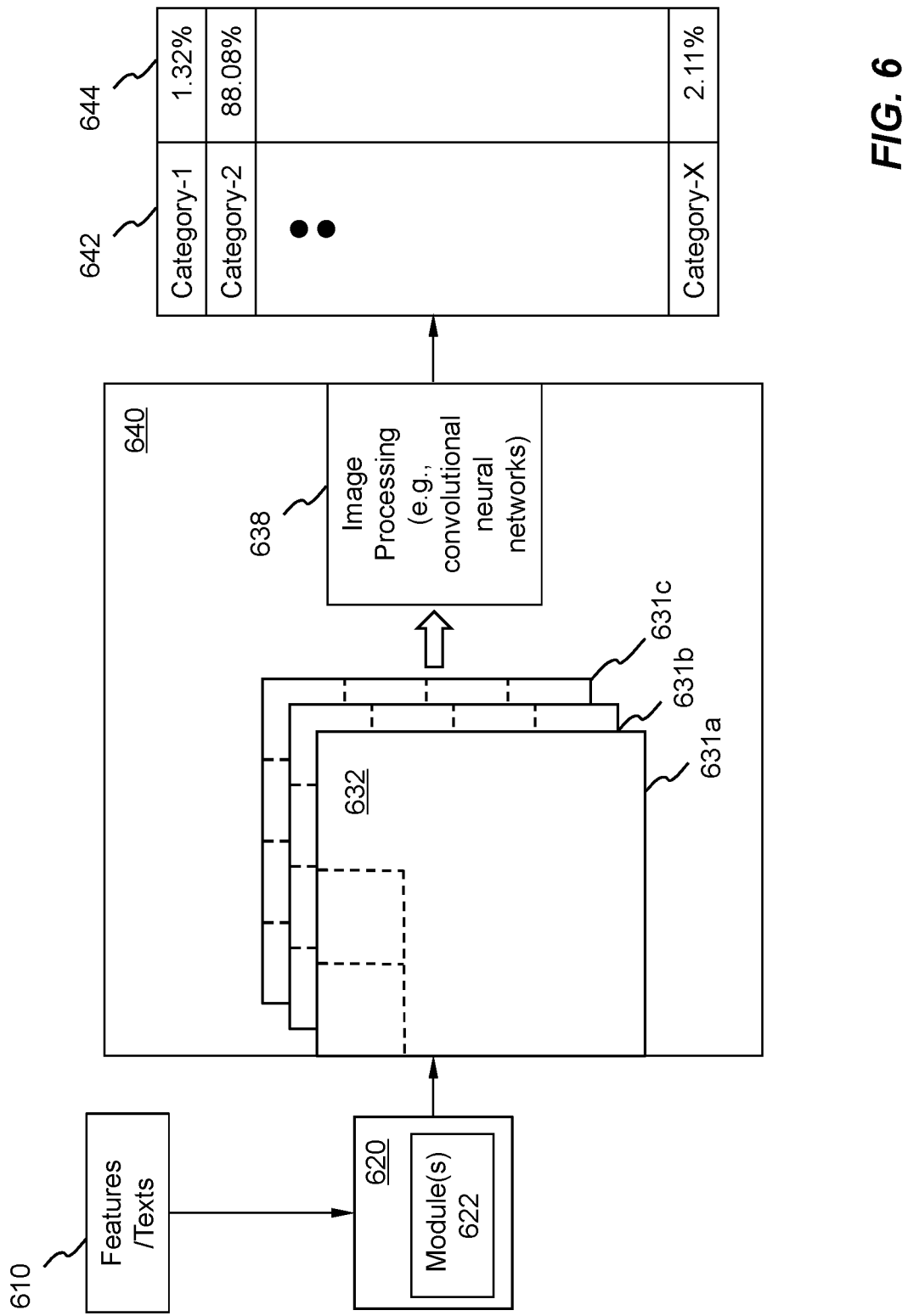
FIG. 6 is a schematic diagram showing an example natural language processing via a multi-layer two-dimensional symbol with image processing technique in accordance with an embodiment of the invention.

FIG. 6 is a schematic diagram showing an example natural language processing via a multi-layer two-dimensional symbol with image process technique.

Features of an object or a string of natural language texts along with associated features are the input 610 to the 2-D symbol creation application module 622 installed on the first computing system 620. A multi-layer two-dimensional symbol 631*a*-631*c* is formed from the input 610. Each two-dimensional symbol 631*a*-631*c* is a matrix of N×N pixels of data (e.g., three different color, Red, Green, and Blue).

Meaning of the combined features contained in the multi-layer two-dimensional symbol 631*a*-631*c* is learned in a second computing system 640 by using an image processing technique 638 to classify the multi-layer two-dimensional symbol 631*a*-631*c*, which is formed in the first computing system 620 and transmitted to the second computing system 640.

Transmitting the multi-layer 2-D symbol 631*a*-631*c* can be performed with many well-known manners, for example, through a network either wired or wireless.

In one embodiment, the first computing system 620 and the second computing system 640 are the same computing system (not shown).

In yet another embodiment, the first computing system 620 is a general-purpose computing system while the second computing system 640 is a CNN based computing system 400 implemented as integrated circuits on a semi-conductor chip shown in FIG. 4A

The image processing technique 638 includes predefining a set of categories 642 (e.g., "Category-1", "Category-2", . . . "Category-X" shown in FIG. 6). As a result of performing the image processing technique 638, respective probabilities 644 of the categories are determined for associating each of the predefined categories 642 with the meaning of the super-character. In the example shown in FIG. 6, the highest probability of 88.08 percent is shown for "Category-2". In other words, the multi-layer two-dimensional symbol 631*a*-631*c* contains a super-character whose meaning has a probability of 88.08 percent associated with "Category-2" amongst all the predefined categories 644. In one embodiment, image processing technique 638 comprises example convolutional neural networks shown in FIG. 7

Figure 7:
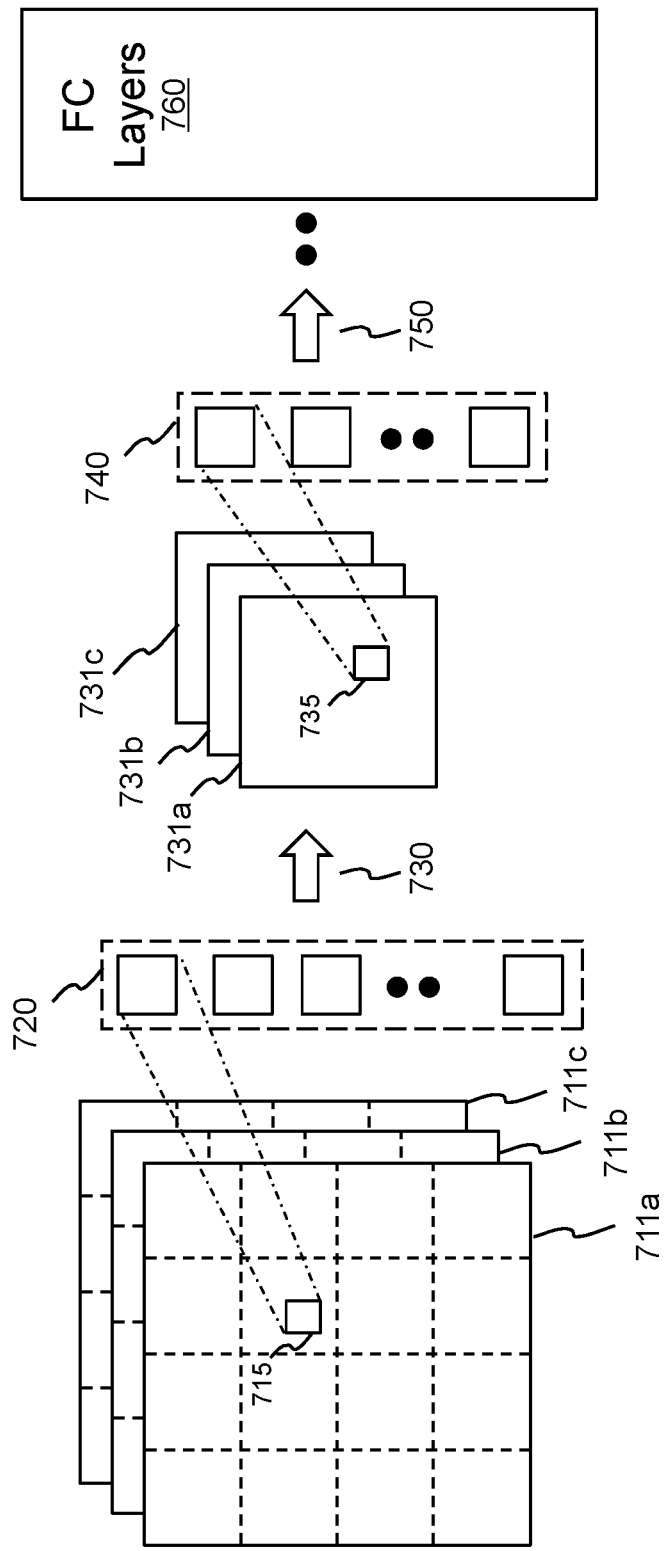
FIG. 7 is a schematic diagram showing an example image processing technique based on convolutional neural networks in accordance with an embodiment of the invention.

FIG. 7 is a schematic diagram showing an example image processing technique based on convolutional neural networks in accordance with an embodiment of the invention.

Based on convolutional neural networks, a multi-layer two-dimensional symbol 711*a*-711*c* as input imagery data is processed with convolutions using a first set of filters or weights 720. Since the imagery data of the 2-D symbol 711*a*-711*c* is larger than the filters 720. Each corresponding overlapped sub-region 715 of the imagery data is processed. After the convolutional results are obtained, activation may be conducted before a first pooling operation 730. In one embodiment, activation is achieved with rectification performed in a rectified linear unit (ReLU). As a result of the first pooling operation 730, the imagery data is reduced to a reduced set of imagery data 731*a*-731*c*. For 2×2 pooling, the reduced set of imagery data is reduced by a factor of 4 from the previous set.

The previous convolution-to-pooling procedure is repeated. The reduced set of imagery data 731*a*-731*c* is then processed with convolutions using a second set of filters 740. Similarly, each overlapped sub-region 735 is processed. Another activation can be conducted before a second pooling operation 740. The convolution-to-pooling procedures are repeated for several layers and finally connected to a Fully-connected (FC) Layers 760. In image classification, respective probabilities 544 of predefined categories 542 can be computed in FC Layers 760.

This repeated convolution-to-pooling procedure is trained using a known dataset or database. For image classification, the dataset contains the predefined categories. A particular set of filters, activation and pooling can be tuned and obtained before use for classifying an imagery data, for example, a specific combination of filter types, number of filters, order of filters, pooling types, and/or when to perform activation. In one embodiment, the imagery data is the multi-layer two-dimensional symbol 711*a*-711*c*, which is form from a string of Latin-alphabet based language texts.

In one embodiment, convolutional neural networks are based on a Visual Geometry Group (VGG16) architecture neural nets.

Figure 8:
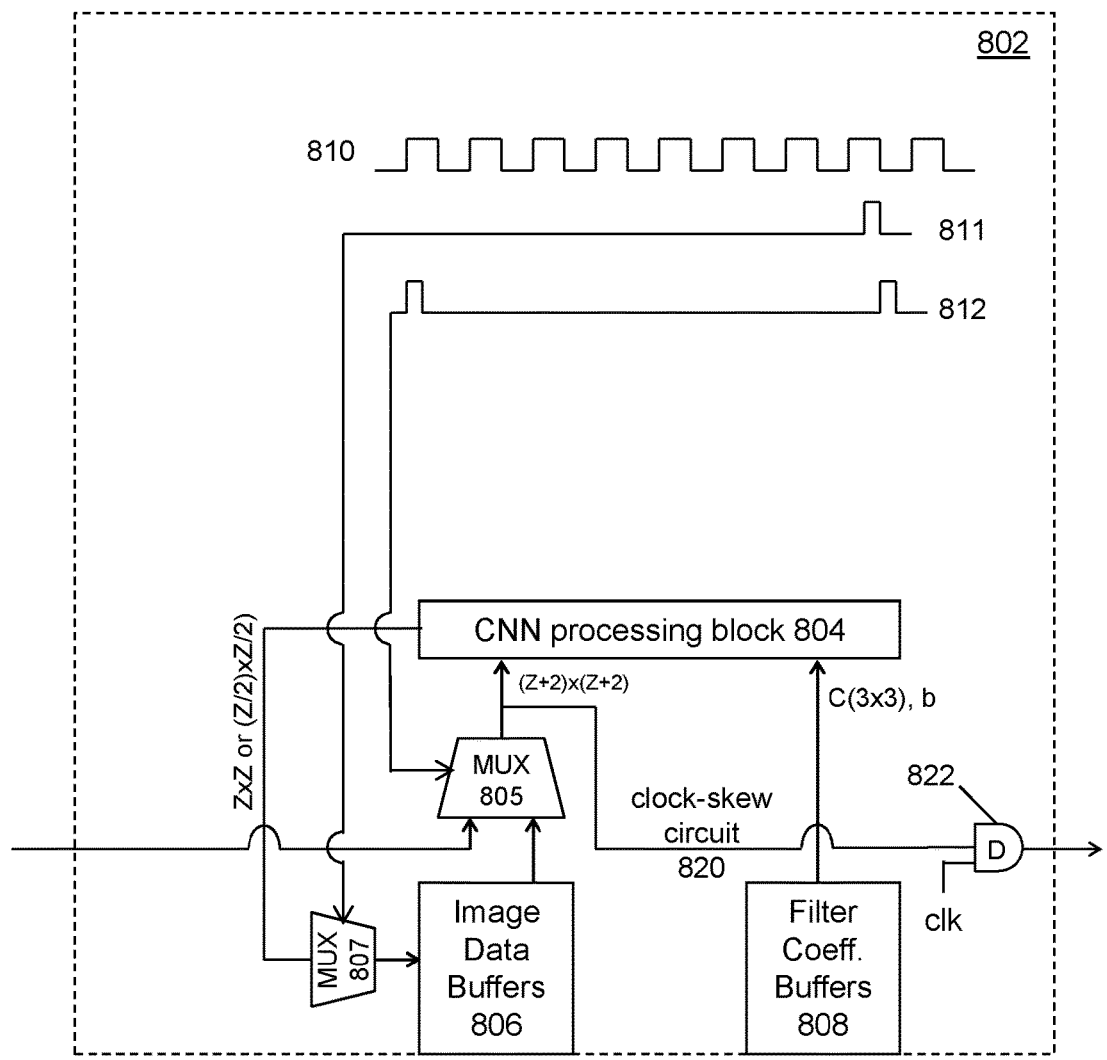
FIG. 8 is a diagram showing an example CNN processing engine in a CNN based integrated circuit, according to one embodiment of the invention.

More details of a CNN processing engine 802 in a CNN based integrated circuit are shown in FIG. 8. A CNN processing block 804 contains digital circuitry that simultaneously obtains Z×Z convolution operations results by performing 3×3 convolutions at Z×Z pixel locations using imagery data of a (Z+2)-pixel by (Z+2)-pixel region and corresponding filter coefficients from the respective memory buffers. The (Z+2)-pixel by (Z+2)-pixel region is formed with the Z×Z pixel locations as an Z-pixel by Z-pixel central portion plus a one-pixel border surrounding the central portion. Z is a positive integer. In one embodiment, Z equals to 14 and therefore, (Z+2) equals to 16, Z×Z equals to 14×14=196, and Z/2 equals 7.

Figure 9:
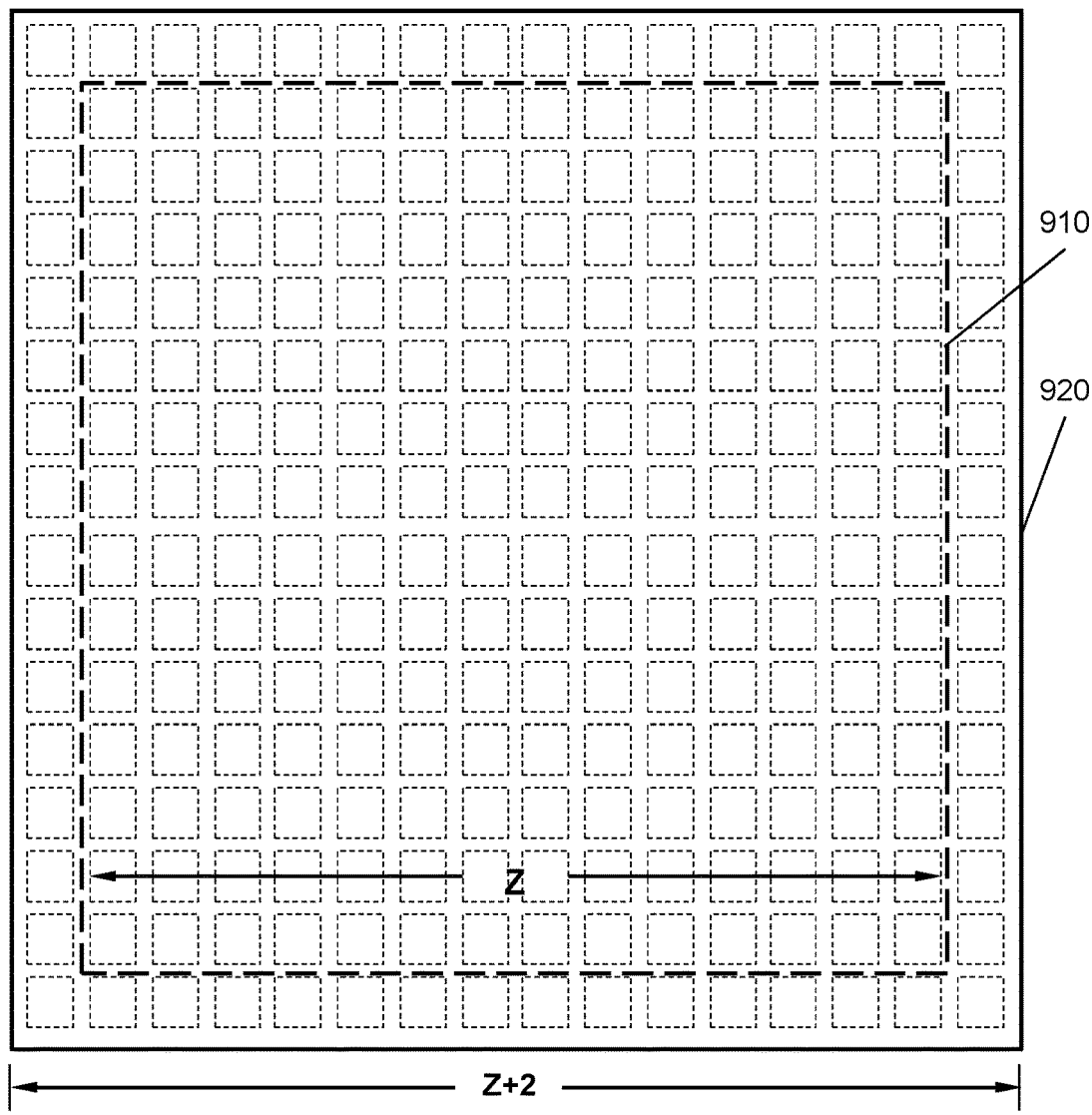
FIG. 9 is a diagram showing an example imagery data region within the example CNN processing engine of FIG. 8, according to an embodiment of the invention.

FIG. 9 is a diagram showing a diagram representing (Z+2)-pixel by (Z+2)-pixel region 910 with a central portion of Z×Z pixel locations 920 used in the CNN processing engine 802.

In order to achieve faster computations, few computational performance improvement techniques have been used and implemented in the CNN processing block 804. In one embodiment, representation of imagery data uses as few bits as practical (e.g., 5-bit representation). In another embodiment, each filter coefficient is represented as an integer with a radix point. Similarly, the integer representing the filter coefficient uses as few bits as practical (e.g., 12-bit representation). As a result, 3×3 convolutions can then be performed using fixed-point arithmetic for faster computations.

Each 3×3 convolution produces one convolution operations result, Out(m, n), based on the following formula:

$$\text{Out}(m, n) = \sum_{1 \leq i, j \leq 3} \text{In}(m, n, i, j) \times C(i, j) - b \qquad (1)$$

where:
- m, n are corresponding row and column numbers for identifying which imagery data (pixel) within the (Z+2)-pixel by (Z+2)-pixel region the convolution is performed;
- In(m,n,i,j) is a 3-pixel by 3-pixel area centered at pixel location (m, n) within the region;
- C(i, j) represents one of the nine weight coefficients C(3×3), each corresponds to one of the 3-pixel by 3-pixel area;
- b represents an offset coefficient; and
- j are indices of weight coefficients C(i, j).

Each CNN processing block 804 produces Z×Z convolution operations results simultaneously and, all CNN processing engines perform simultaneous operations. In one embodiment, the 3×3 weight or filter coefficients are each 12-bit while the offset or bias coefficient is 16-bit or 18-bit.

Figure 10A:
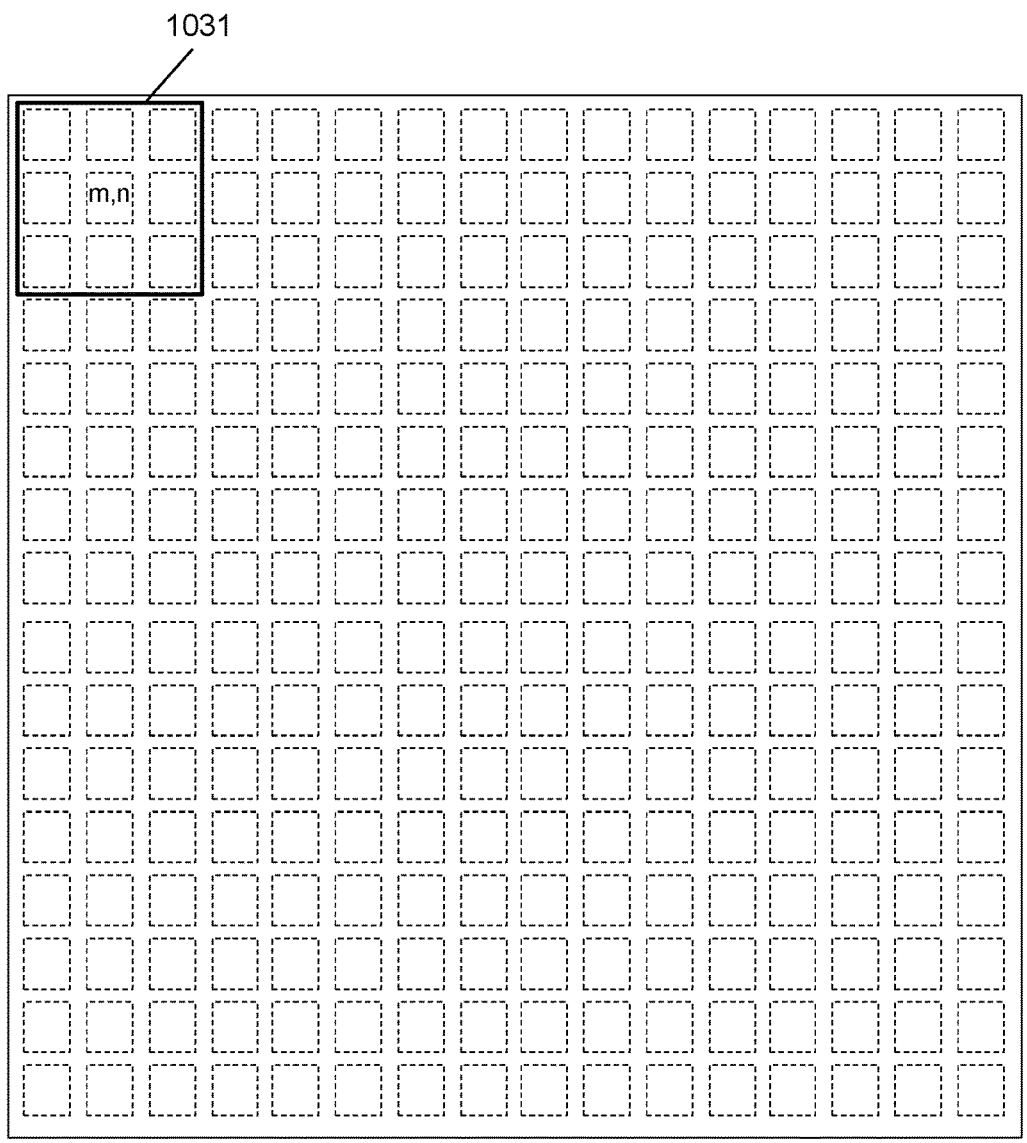
FIGS. 10A-10C are diagrams showing three example pixel locations within the example imagery data region of FIG. 9, according to an embodiment of the invention.
Figure 10B:
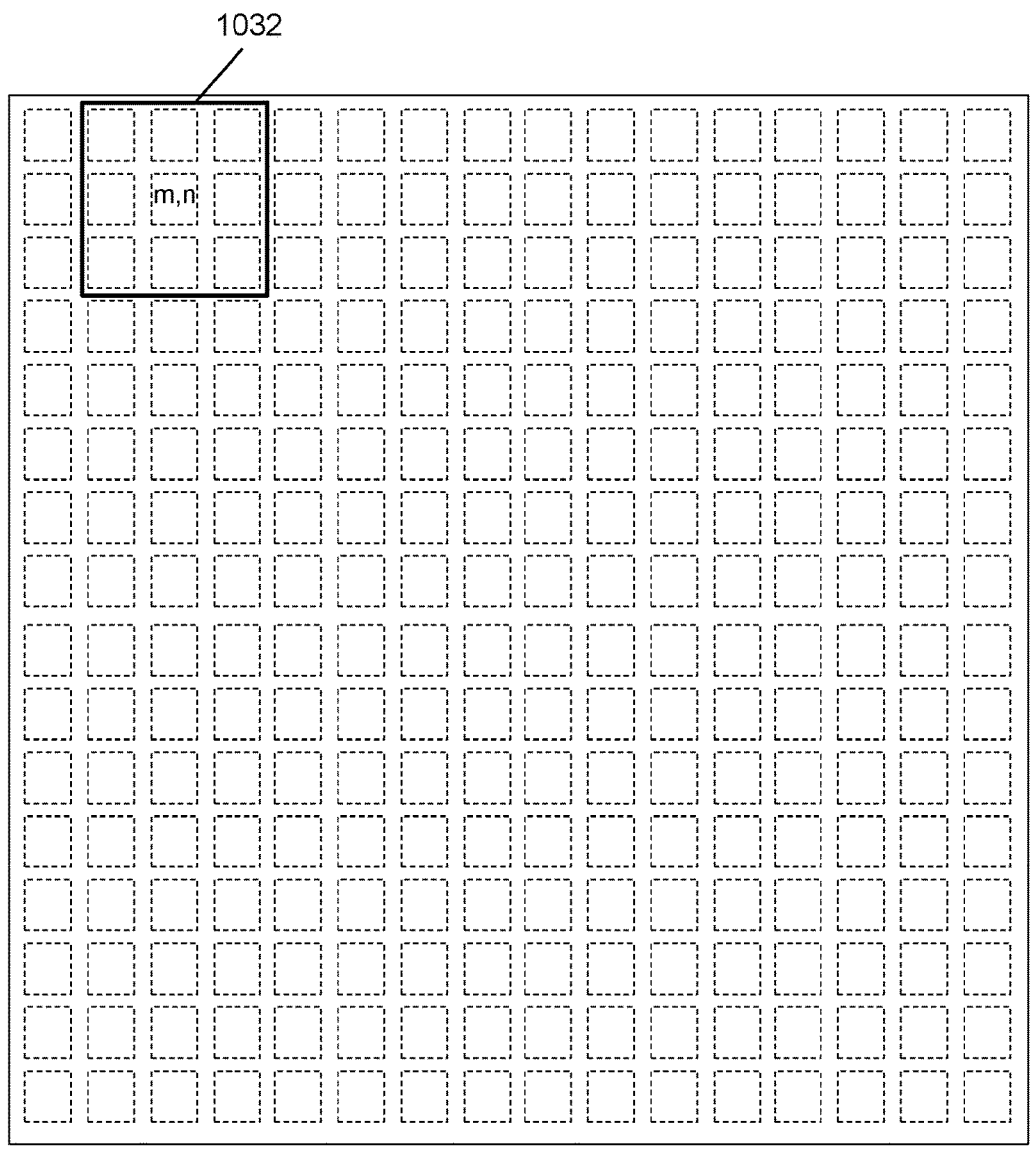
Figure 10C:
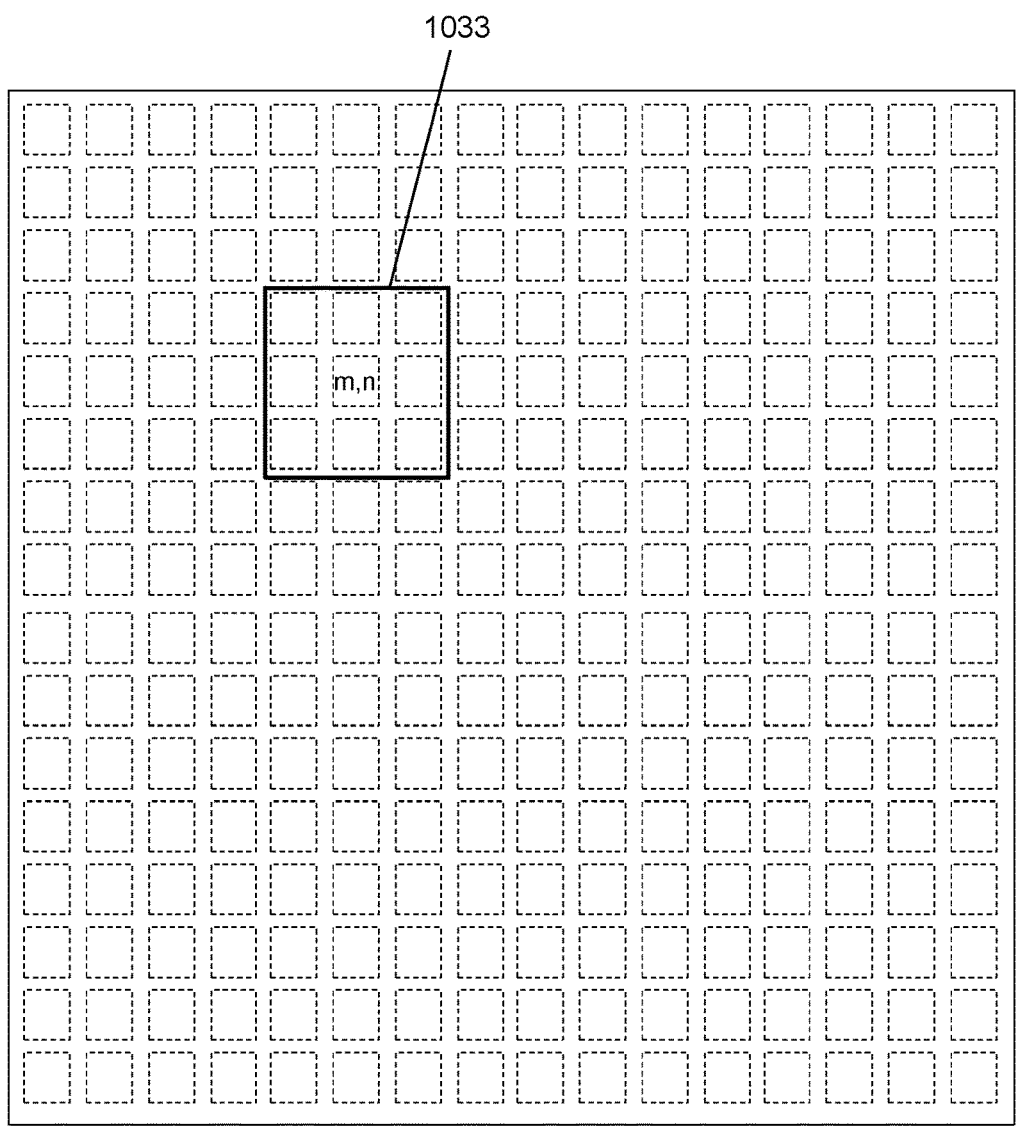

FIGS. 10A-10C show three different examples of the Z×Z pixel locations. The first pixel location 1031 shown in FIG. 10A is in the center of a 3-pixel by 3-pixel area within the (Z+2)-pixel by (Z+2)-pixel region at the upper left corner. The second pixel location 1032 shown in FIG. 10B is one pixel data shift to the right of the first pixel location 1031.

The third pixel location 1033 shown in FIG. 10C is a typical example pixel location. Z×Z pixel locations contain multiple overlapping 3-pixel by 3-pixel areas within the (Z+2)-pixel by (Z+2)-pixel region.

Figure 11:
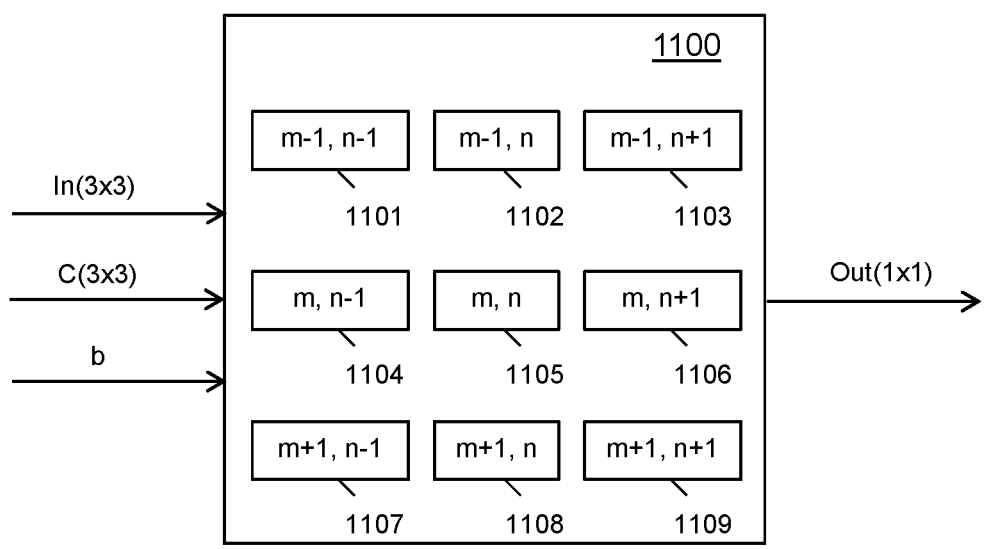
FIG. 11 is a diagram illustrating an example data arrangement for performing 3×3 convolutions at a pixel location in the example CNN processing engine of FIG. 8, according to one embodiment of the invention.

To perform 3×3 convolutions at each sampling location, an example data arrangement is shown in FIG. 11. Imagery data (i.e., In(3×3)) and filter coefficients (i.e., weight coefficients C(3×3) and an offset coefficient b) are fed into an example CNN 3×3 circuitry 1100. After 3×3 convolutions operation in accordance with Formula (1), one output result (i.e., Out(1×1)) is produced. At each sampling location, the imagery data In(3×3) is centered at pixel coordinates (m, n) 1105 with eight immediate neighbor pixels 1101-1104, 1106-1109.

Imagery data are stored in a first set of memory buffers 806, while filter coefficients are stored in a second set of memory buffers 808. Both imagery data and filter coefficients are fed to the CNN block 804 at each clock of the digital integrated circuit. Filter coefficients (i.e., C(3×3) and b) are fed into the CNN processing block 804 directly from the second set of memory buffers 808. However, imagery data are fed into the CNN processing block 804 via a multiplexer MUX 805 from the first set of memory buffers 806. Multiplexer 805 selects imagery data from the first set of memory buffers based on a clock signal (e.g., pulse 812).

Otherwise, multiplexer MUX 805 selects imagery data from a first neighbor CNN processing engine (from the left side of FIG. 8 not shown) through a clock-skew circuit 820.

At the same time, a copy of the imagery data fed into the CNN processing block 804 is sent to a second neighbor CNN processing engine (to the right side of FIG. 8 not shown) via the clock-skew circuit 820. Clock-skew circuit 820 can be achieved with known techniques (e.g., a D flip-flop 822).

After 3×3 convolutions for each group of imagery data are performed for predefined number of filter coefficients, convolution operations results Out(m, n) are sent to the first set of memory buffers via another multiplex MUX 807 based on another clock signal (e.g., pulse 811). An example clock cycle 810 is drawn for demonstrating the time relationship between pulse 811 and pulse 812. As shown pulse 811 is one clock before pulse 812, as a result, the 3×3 convolution operations results are stored into the first set of memory buffers after a particular block of imagery data has been processed by all CNN processing engines through the clock-skew circuit 820.

After the convolution operations result Out(m, n) is obtained from Formula (1), activation procedure may be performed. Any convolution operations result, Out(m, n), less than zero (i.e., negative value) is set to zero. In other words, only positive value of output results are kept. For example, positive output value 10.5 retains as 10.5 while −2.3 becomes 0. Activation causes non-linearity in the CNN based integrated circuits.

If a 2×2 pooling operation is required, the Z×Z output results are reduced to (Z/2)×(Z/2). In order to store the (Z/2)×(Z/2) output results in corresponding locations in the first set of memory buffers, additional bookkeeping techniques are required to track proper memory addresses such that four (Z/2)×(Z/2) output results can be processed in one CNN processing engine.

Figure 12A:
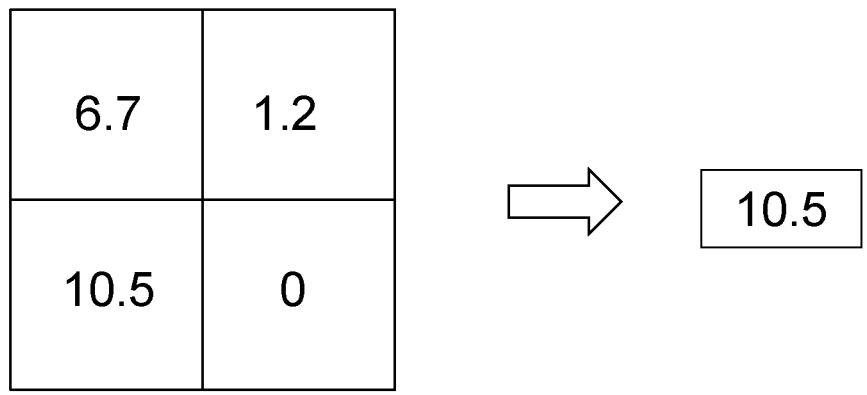
FIGS. 12A-12B are diagrams showing two example 2×2 pooling operations according to an embodiment of the invention.
Figure 12B:
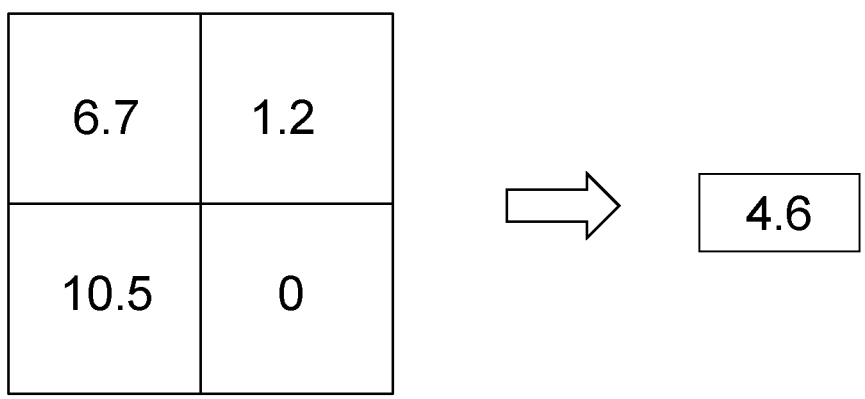
Figure 13:
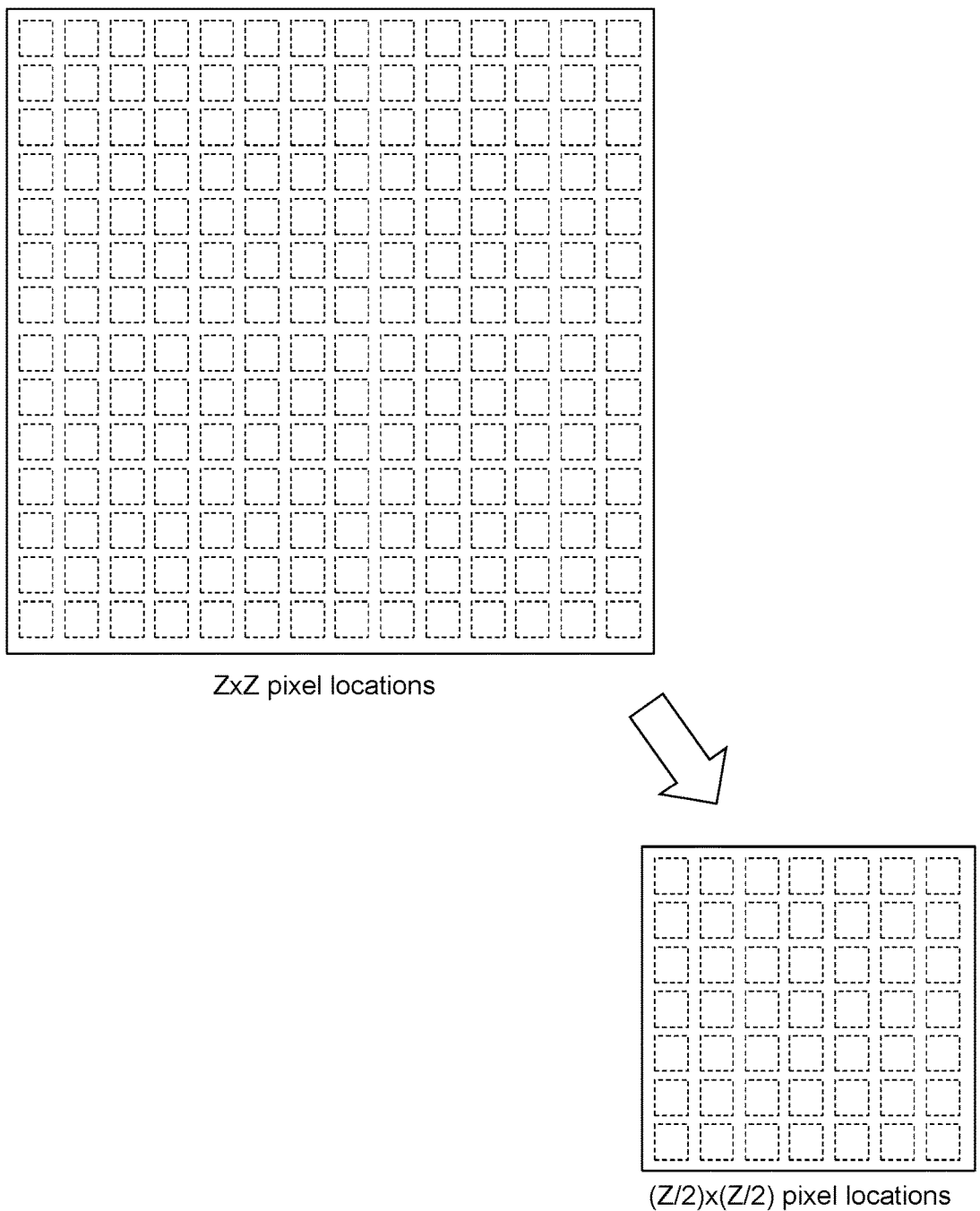
FIG. 13 is a diagram illustrating a 2×2 pooling operation of an imagery data in the example CNN processing engine of FIG. 8, according to one embodiment of the invention.

To demonstrate a 2×2 pooling operation, FIG. 12A is a diagram graphically showing first example output results of a 2-pixel by 2-pixel block being reduced to a single value 10.5, which is the largest value of the four output results. The technique shown in FIG. 12A is referred to as "max pooling". When the average value 4.6 of the four output results is used for the single value shown in FIG. 12B, it is referred to as "average pooling". There are other pooling operations, for example, "mixed max average pooling" which is a combination of "max pooling" and "average pooling". The main goal of the pooling operation is to reduce size of the imagery data being processed. FIG. 13 is a diagram illustrating Z×Z pixel locations, through a 2×2 pooling operation, being reduced to (Z/2)×(Z/2) locations, which is one fourth of the original size.

Figure 14A:
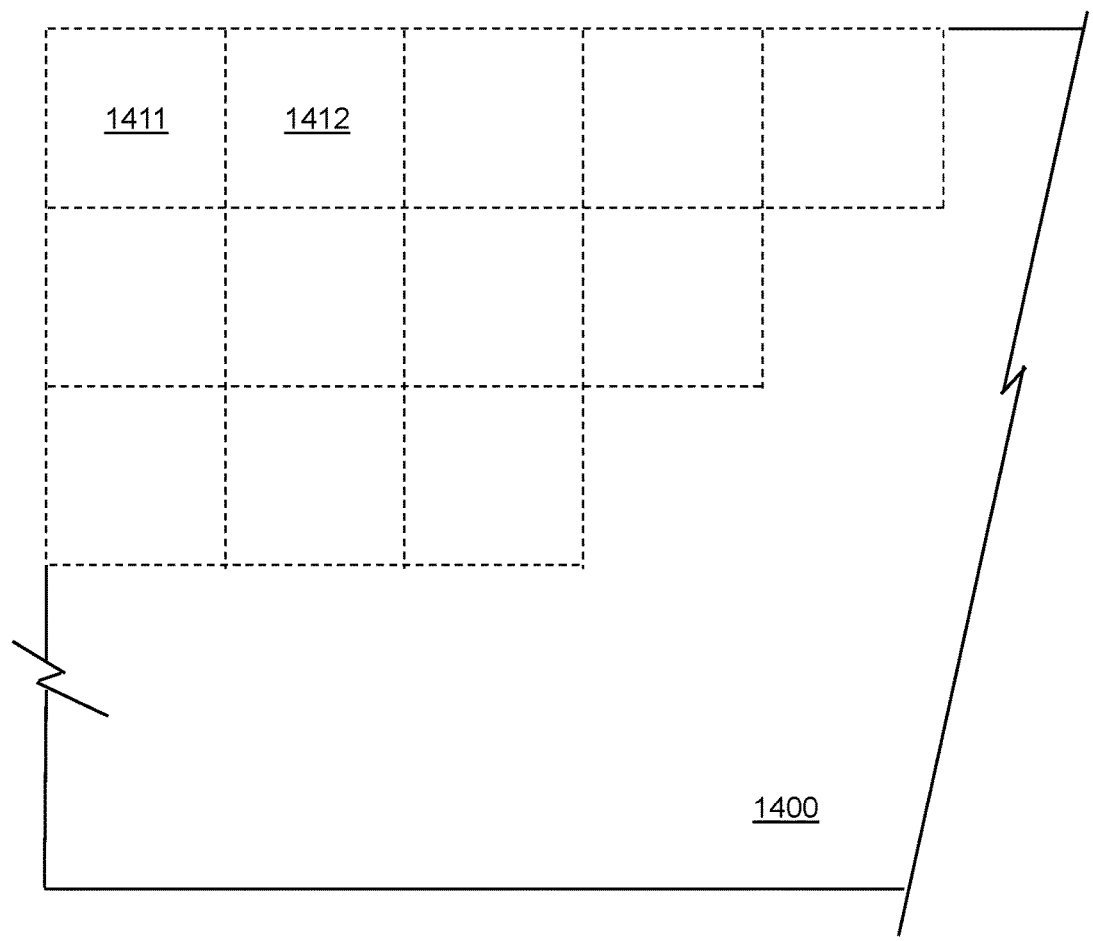
FIGS. 14A-14C are diagrams illustrating various examples of imagery data region within an input image, according to one embodiment of the invention.

An input image generally contains a large amount of imagery data. In order to perform image processing operations, an example input image 1400 (e.g., a two-dimensional symbol 100 of FIG. 1) is partitioned into Z-pixel by Z-pixel blocks 1411-1412 as shown in FIG. 14A. Imagery data associated with each of these Z-pixel by Z-pixel blocks is then fed into respective CNN processing engines. At each of the Z×Z pixel locations in a particular Z-pixel by Z-pixel block, 3×3 convolutions are simultaneously performed in the corresponding CNN processing block.

Although the invention does not require specific characteristic dimension of an input image, the input image may be required to resize to fit into a predefined characteristic dimension for certain image processing procedures. In an embodiment, a square shape with $(2^L \times Z)$-pixel by $(2^L \times Z)$-pixel is required. L is a positive integer (e.g., 1, 2, 3, 4, etc.). When Z equals 14 and L equals 4, the characteristic dimension is 224. In another embodiment, the input image is a rectangular shape with dimensions of $(2^I \times Z)$-pixel and $(2^J \times Z)$-pixel, where I and J are positive integers.

Figure 14B:
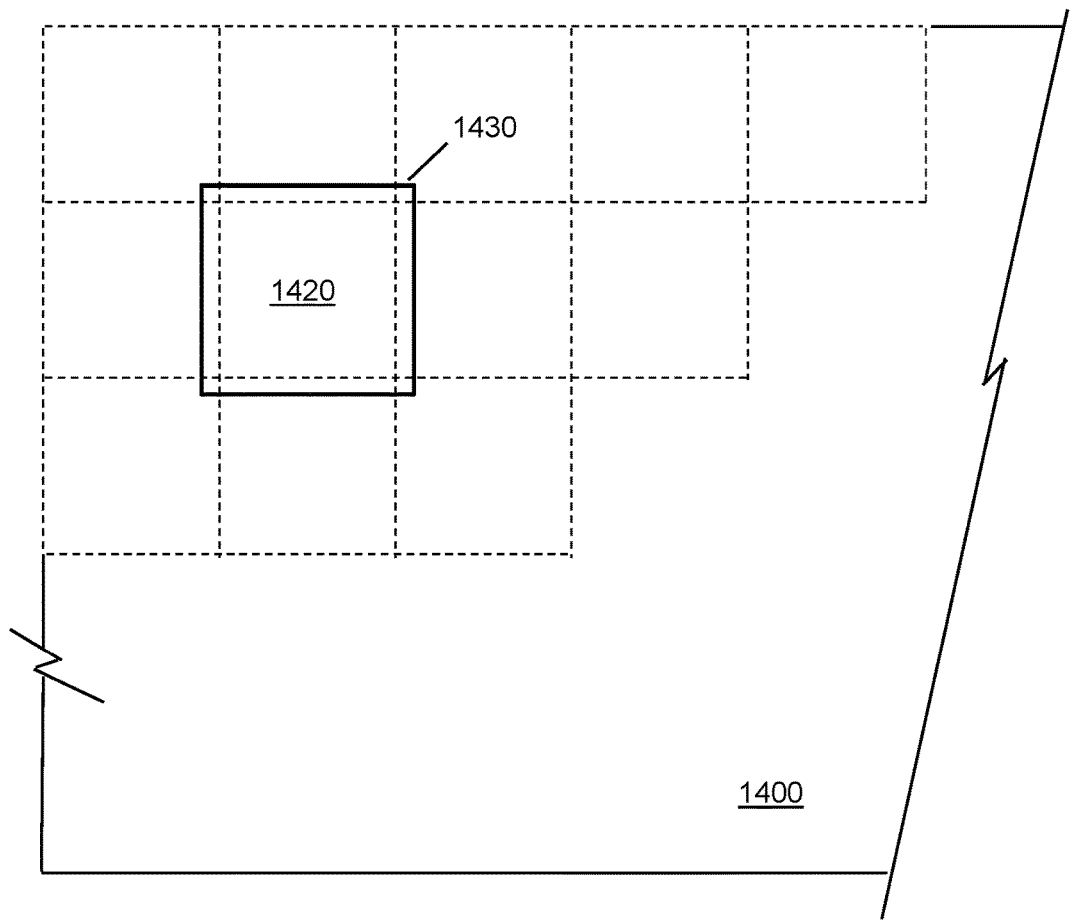

In order to properly perform 3×3 convolutions at pixel locations around the border of a Z-pixel by Z-pixel block, additional imagery data from neighboring blocks are required. FIG. 14B shows a typical Z-pixel by Z-pixel block 1420 (bordered with dotted lines) within a (Z+2)-pixel by (Z+2)-pixel region 1430. The (Z+2)-pixel by (Z+2)-pixel region is formed by a central portion of Z-pixel by Z-pixel from the current block, and four edges (i.e., top, right, bottom and left) and four corners (i.e., top-left, top-right, bottom-right and bottom-left) from corresponding neighboring blocks.

Figure 14C:
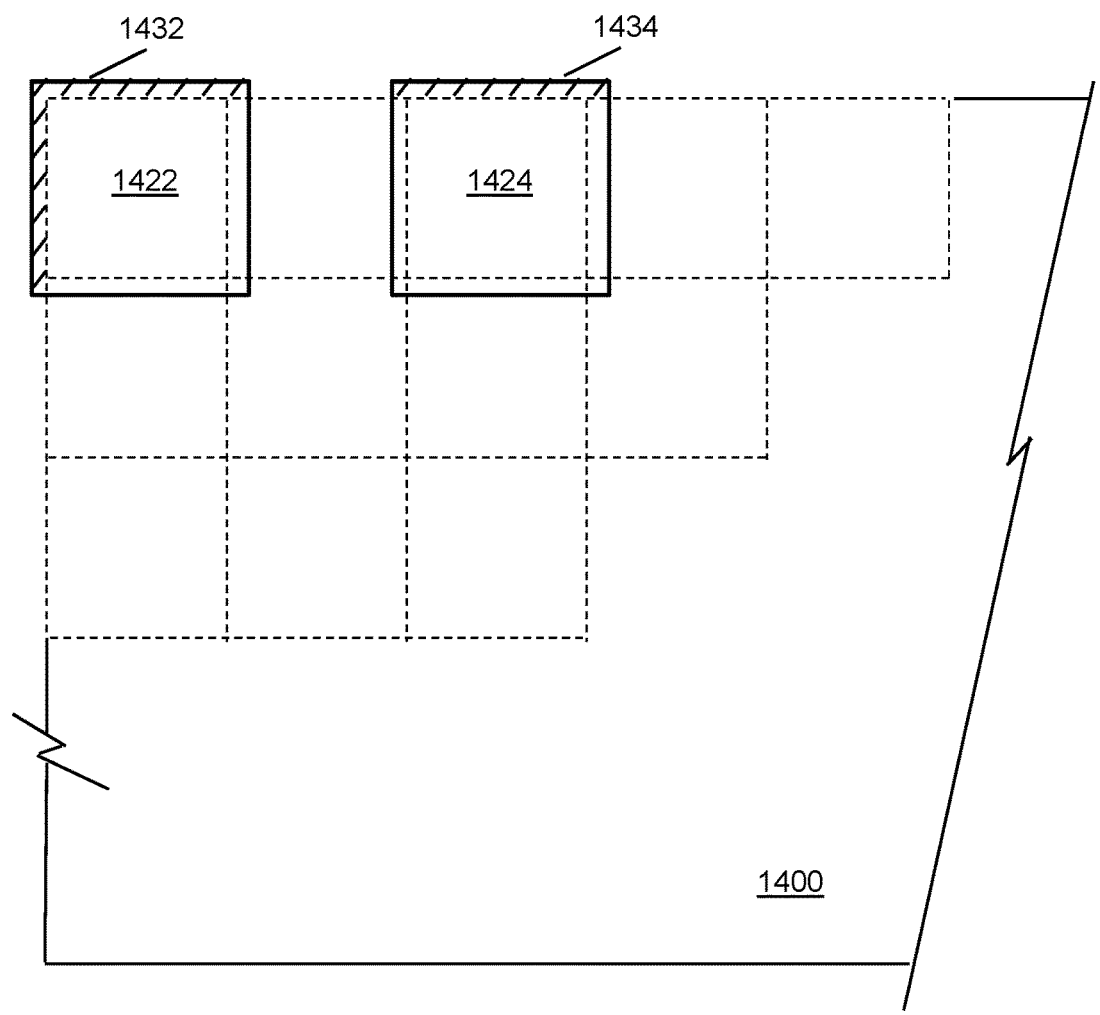

FIG. 14C shows two example Z-pixel by Z-pixel blocks 1422-1424 and respective associated (Z+2)-pixel by (Z+2)-pixel regions 1432-1434. These two example blocks 1422-1424 are located along the perimeter of the input image. The first example Z-pixel by Z-pixel block 1422 is located at top-left corner, therefore, the first example block 1422 has neighbors for two edges and one corner. Value "0"s are used for the two edges and three corners without neighbors (shown as shaded area) in the associated (Z+2)-pixel by (Z+2)-pixel region 1432 for forming imagery data. Similarly, the associated (Z+2)-pixel by (Z+2)-pixel region 1434 of the second example block 1424 requires "0"s be used for the top edge and two top corners. Other blocks along the perimeter of the input image are treated similarly. In other words, for the purpose to perform 3×3 convolutions at each pixel of the input image, a layer of zeros ("0" s) is added outside of the perimeter of the input image. This can be achieved with many well-known techniques. For example, default values of the first set of memory buffers are set to zero. If no imagery data is filled in from the neighboring blocks, those edges and corners would contain zeros.

Figure 15:
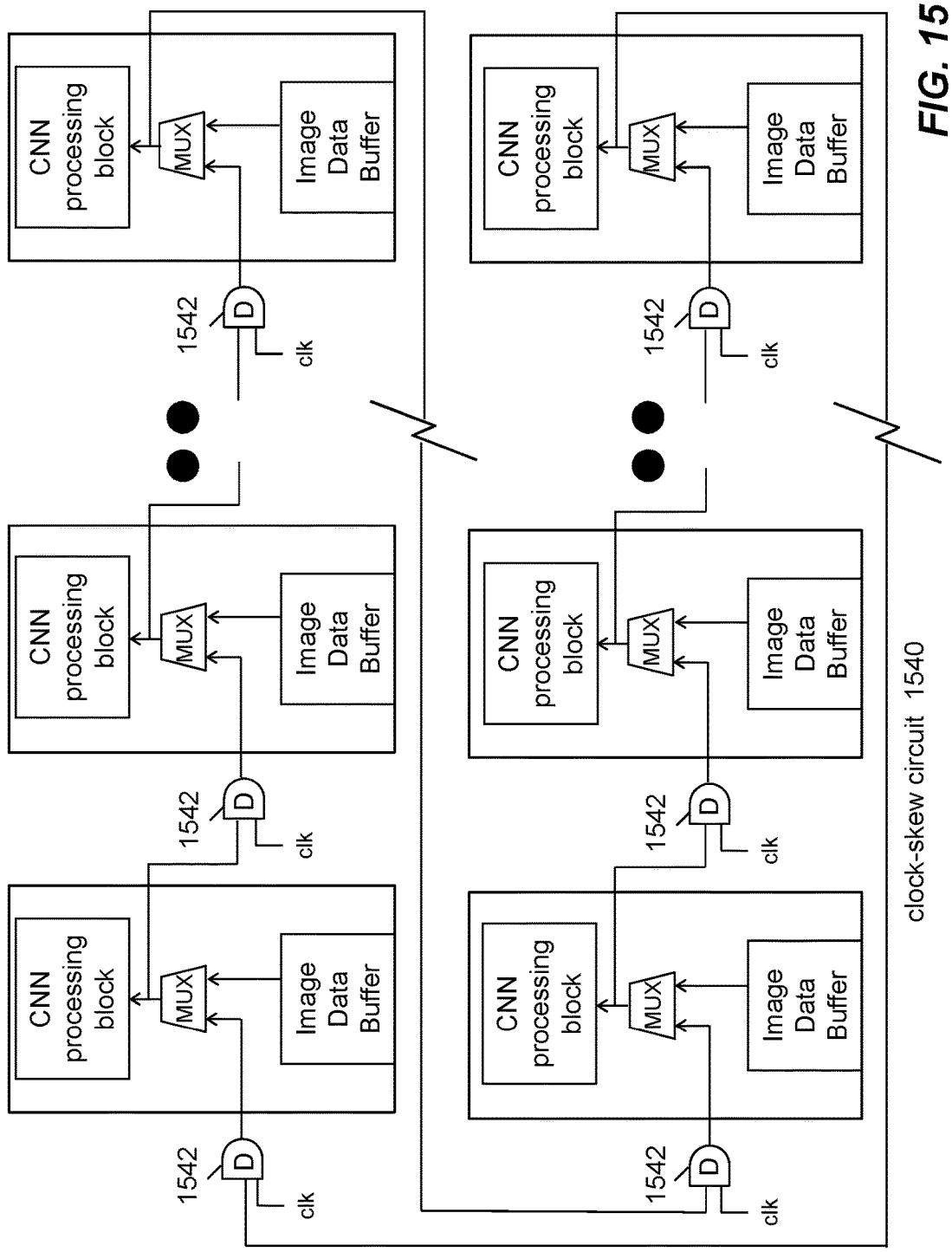
FIG. 15 is a diagram showing a plurality of CNN processing engines connected as a loop via an example clock-skew circuit in accordance of an embodiment of the invention.

When more than one CNN processing engine is configured on the integrated circuit. The CNN processing engine is connected to first and second neighbor CNN processing engines via a clock-skew circuit. For illustration simplicity, only CNN processing block and memory buffers for imagery data are shown. An example clock-skew circuit 1540 for a group of example CNN processing engines are shown in FIG. 15.

CNN processing engines connected via the second example clock-skew circuit 1540 to form a loop. In other words, each CNN processing engine sends its own imagery data to a first neighbor and, at the same time, receives a second neighbor's imagery data. Clock-skew circuit 1540 can be achieved with well-known manners. For example, each CNN processing engine is connected with a D flip-flop 1542.

Although the invention has been described with reference to specific embodiments thereof, these embodiments are merely illustrative, and not restrictive of, the invention. Various modifications or changes to the specifically disclosed example embodiments will be suggested to persons skilled in the art. For example, whereas the two-dimensional symbol has been described and shown with a specific example of a matrix of 224×224 pixels, other sizes may be used for achieving substantially similar objectives of the invention, for example, 896×896. Furthermore, whereas the string of natural language texts has been shown and described to be arranged as left-to-right, top-to-bottom, other ordered may be used for achieving the same, for example, bottom-to-up, right-to-left or any other consistent combinations. In summary, the scope of the invention should not be restricted to the specific example embodiments disclosed herein, and all modifications that are readily suggested to those of ordinary skill in the art should be included within the spirit and purview of this application and scope of the appended claims.

What is claimed is:

1. A method of facilitating machine learning via two-dimensional (2-D) symbols comprising:
    receiving a plurality of features of an object in a first computing system having a 2-D symbol creation application module installed thereon;
    forming, with the 2-D symbol creation application module in the first computing system, a multi-layer 2-D symbol from the plurality of features in accordance with a set of symbol creation rules, the 2-D symbol being a matrix of N×N pixels partitioned into a plurality of sub-matrices with each sub-matrix containing one of the features, where N is a positive integer; and
    learning a meaning of the combined features contained in the 2-D symbol in a second computing system by using an image processing technique to classify the 2-D symbol formed in the first computing system and then transmitted to the second computing system;
    wherein the set of symbol creation rules comprises:
    determining an importance order of the plurality of features based on one of machine learning techniques;
    associating a corresponding feature with said each sub-matrix according to the importance order;
    determining a size of said each sub-matrix based on the corresponding feature; and
    placing said each sub-matrix in a particular location in the 2-D symbol according to the size and the importance order.

2. The method of claim 1, wherein the plurality of features comprises a numerical feature being represented by a number glyph.

3. The method of claim 1, wherein the plurality of features comprises a categorical feature being represented by a word or an abbreviation in a particular language.

4. The method of claim 1, wherein said each sub-matrix has a square shape.

5. The method of claim 1, wherein said each sub-matrix has a rectangular shape.

6. The method of claim 1, wherein the plurality of sub-matrices contains equal sized sub-matrices.

7. The method of claim 1, wherein the plurality of sub-matrices contains various sized sub-matrices.

8. The method of claim 1, wherein the machine learning techniques comprise Logistic Regression.

9. The method of claim 1, wherein the machine learning techniques comprise Support Vector Machine.

10. The method of claim 1, wherein the machine learning techniques comprise Gradient Boosting Machine.

11. A method of facilitating machine learning via two-dimensional (2-D) symbols comprising:
    receiving a string of natural language texts and a plurality of features associated with the texts in a first computing system having a 2-D symbol creation application module installed thereon;
    forming, with the 2-D symbol creation application module in the first computing system, a multi-layer 2-D symbol from the string of natural language texts and the features in accordance with a set of symbol creation rules, the 2-D symbol being a matrix of N×N pixels divided into first and second portions, the first portion being configured for containing the string of natural language texts and the second portion being partitioned into a plurality of sub-matrices with each sub-matrix containing one of the features, where N is a positive integer; and
    learning a meaning of the string of natural language texts along with the associated features contained in the 2-D symbol in a second computing system by using an image processing technique to classify the 2-D symbol formed in the first computing system and then transmitted to the second computing system;
    wherein the set of symbol creation rules comprises:
    determining an importance order of the plurality of features based on one of machine learning techniques;
    associating a corresponding feature with said each sub-matrix according to the importance order;
    determining a size of said each sub-matrix based on the corresponding feature;
    placing the string of language texts in a particular location in the first portion of the 2-D symbol; and
    placing said each sub-matrix in a particular location in the second portion of the 2-D symbol according to the size and the importance order.

12. The method of claim 11, wherein each of the first and second portions occupies one half of the 2-D symbol.

13. The method of claim 12, wherein the first portion occupies perimeter of the 2-D symbol, while the second portion occupies center of the 2-D symbol.

14. The method of claim 11, wherein the machine learning techniques comprise Logistic Regression, Support Vector Machine, or Gradient Boosting Machine.

15. The method of claim 11, wherein the meaning comprises a sentiment of the texts.

* * * * *